(12) United States Patent
Sala Sabate et al.

(10) Patent No.: US 8,401,471 B2
(45) Date of Patent: Mar. 19, 2013

(54) LARGE BAND INDUCTIVE ANTENNA FOR CONTACTLESS COMMUNICATION SYSTEMS

(75) Inventors: Judit Sala Sabate, Barcelone (ES); Thierry Thomas, Varces Allieres et Risset (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 411 days.

(21) Appl. No.: 12/741,275

(22) PCT Filed: Nov. 5, 2008

(86) PCT No.: PCT/EP2008/064993
§ 371 (c)(1),
(2), (4) Date: Aug. 3, 2010

(87) PCT Pub. No.: WO2009/059997
PCT Pub. Date: May 14, 2009

(65) Prior Publication Data
US 2010/0297938 A1    Nov. 25, 2010

(30) Foreign Application Priority Data
Nov. 5, 2007   (FR) ..................................... 07 58794

(51) Int. Cl.
*H04B 5/00*   (2006.01)
(52) U.S. Cl. .................. 455/41.1; 455/41.2; 455/575.5; 455/575.7; 455/558; 340/572.1; 340/572.4; 340/572.7; 343/700 MS; 343/895; 343/702; 343/742; 235/462.25; 235/462.45; 336/200

(58) Field of Classification Search .................. 455/41.1, 455/41.2, 558, 575.5, 575.7
See application file for complete search history.

(56) References Cited

U.S. PATENT DOCUMENTS

| 4,739,269 | A | 4/1988 | Kopp |
| 5,198,826 | A | 3/1993 | Ito |
| 5,691,731 | A | 11/1997 | Van Erven |
| 7,379,024 | B2 * | 5/2008 | Forster et al. .......... 343/700 MS |
| 7,489,276 | B2 * | 2/2009 | Qi et al. ......................... 343/702 |
| 7,501,984 | B2 * | 3/2009 | Forster et al. .......... 343/700 MS |
| 7,607,586 | B2 * | 10/2009 | Wang .............................. 235/492 |
| 7,633,392 | B2 * | 12/2009 | Neuwirth .................... 340/572.1 |
| 7,652,636 | B2 * | 1/2010 | Forster et al. .................. 343/860 |

(Continued)

FOREIGN PATENT DOCUMENTS

| EP | 1 976 171 A2 | 10/2008 |
| FR | 2826784 | 1/2003 |

(Continued)

*Primary Examiner* — Marceau Milord
(74) *Attorney, Agent, or Firm* — Oblon, Spivak, McClelland, Maier & Neustadt, L.L.P.

(57) ABSTRACT

Signal transmission and/or reception device, by contactless inductive coupling comprising at least one structure forming one or several antennas, said structure comprising a plurality of conducting links (102, 106) in at least two parallel and distinct planes, a first plurality of said conducting links forming a first conducting circuit (104, 204, 304, 404, 504, 604, 704) through which a current ($I_1$) will circulate, and a second plurality of said conducting links forms at least one second conducting circuit (108, 208, 308, 408, 508, 608, 708), distinct from said first circuit, and through which a current ($I_2$) will circulate, the links being arranged such that the coefficient coupling between pairs of said circuits is zero or at least less than 5% or less than 1%.

15 Claims, 19 Drawing Sheets

U.S. PATENT DOCUMENTS

| | | | |
|---|---|---|---|
| 7,755,552 B2 * | 7/2010 | Schantz et al. | 343/718 |
| 7,755,556 B2 * | 7/2010 | Forster et al. | 343/767 |
| 7,782,267 B2 * | 8/2010 | Kubo et al. | 343/787 |
| 7,784,688 B2 * | 8/2010 | Wang | 235/385 |
| 7,812,771 B2 * | 10/2010 | Greene et al. | 343/702 |
| 8,249,500 B2 * | 8/2012 | Wilson | 455/41.1 |
| 8,260,199 B2 * | 9/2012 | Kowalski | 455/41.1 |
| 2005/0179604 A1 | 8/2005 | Liu et al. | |
| 2005/0212707 A1 | 9/2005 | Egbert et al. | |

FOREIGN PATENT DOCUMENTS

JP 62-61430 3/1987

* cited by examiner

LARGE BAND INDUCTIVE ANTENNA FOR CONTACTLESS COMMUNICATION SYSTEMS

TECHNICAL FIELD

This invention is applicable to the subject of antennas, particularly in data transmission systems using inductive coupling, and possibly in devices that can provide remote power supply.

The invention allows for the installation of new inductive antenna structures, particularly in contactless communicating systems making information exchanges between a fixed station (reader, interrogator, coupler, PCD) and a mobile object (transponder, label, card, PICC), placed in the electromagnetic field emitted by the fixed station.

For example, the invention is applicable to Radio Frequency Identification (RFID) systems, devices according to standard ISO 14443 in which contactless exchanges between a PICC (Proximity Integrated Circuit Card) element and a PCD (Proximity Coupling Device) element are made, and NFC devices according to standard 18892.

The antenna device according to the invention may be intended for use in fixed stations such as card readers, particularly to achieve high data transmission rates in transmission and/or reception, and possibly to perform an optimum remote power supply function.

PRIOR ART

Communication systems according to standard 14443 usually use a central frequency of the order of 13.56 MHz with a wavelength of the order of 22 meters, much longer than the dimensions of the communication system. In these systems, the dimensions of antennas and the distance between the fixed station (for example a reader) and a mobile object (for example a card) do not exceed usually a few decimetres. Communications are set up through a wireless link between two windings, a reader antenna and a card antenna, through an inductive type coupling. The main parameters of the communication system antennas are the inductances of windings, mutual inductances or coupling coefficients between windings, and the quality factor of windings. The reader antenna in the form of a winding is connected to a signal generator designed to provide a current in the winding, so as to produce a variable magnetic field with a given central frequency, for example 13.56 MHz, in the space surrounding this antenna. When the card is placed close to the reader, the card antenna is subjected to a variable field which generates an electromotive force (e.m.f) within the winding of the card antenna. A "parallel resonance" circuit through the connection of a capacitance to the terminals of the winding can generate a higher voltage, Q×e.m.f, at the terminals of the winding, where Q is an overvoltage factor. This voltage can supply power to a specific electronic circuit, for example an electronic chip, connected to the terminals of the antenna winding of the card. This type of power supply is called a contactless or wireless power supply, or a "remote power supply". Information can also be transmitted to the electronic chip on the card by modulating the signal applied to the reader antenna winding. The fact that the antenna winding of the card is connected to a capacitance and to an electronic circuit causes current circulation within this winding. This current circulating in the winding of the card produces a second field that is additional to the first field in the space surrounding the system, and produces a second electromotive force within the reader antenna winding. This effect is proportional to the current circulating in the reader antenna winding, therefore the electromotive force produced by the card on the reader antenna winding may be treated like an impedance, called the coupling impedance. The variation of impedance parameters of the electronic chip connected to the card antenna winding causes a variation of this impedance transferred into the reader antenna winding. The card can then use this means commonly called "load modulation" to transmit information to the reader. Data can thus be transmitted between the reader and the card.

The coupling devices between the card and the reader are windings or coils of conducting elements. These conducting elements may be in different forms, for example wires with circular cross-sections or the tracks of a printed circuit. In general, these windings are called antennas or inductive antennas. The passband of the reader is defined mainly by the quality factor of a resonator, with a bandwidth proportional to the series loss resistance. The capacity to produce a field is directly related to the current circulating in the antenna winding. The current for a constant voltage source reduces as the series resistance increases. Reader antennas may be formed from a conducting circuit made on the printed circuit, for which the geometry may for example be rectangular, circular or elliptical, and its size may vary from a few centimetres to several decimetres. The geometry of the antenna refers to the design or pattern formed by a winding, or by metallic tracks forming the antenna.

Existing contactless radio frequency identification card systems usually have a low data transmission speed, since existing applications such as exchanges of date, timetable, identification number, barcode data do not require large volume transfers.

With the appearance of new applications, for example exchanges of biometric data for passports, transmissions of larger data volumes are expected. Amendments to standard 14443 have been added so as to achieve speeds qualified as "high speeds" (for example 212 kbps, 424 kbps and 847 kbps), while amendments are planned for speeds qualified as "very high speeds" (for example 1.7 Mbps, 3.4 Mbps and 5.1 Mbps, 10.1 Mbps).

One solution for obtaining such speeds would be to broaden the passband of reader antennas. The use of a complex modulation, for example multi-amplitude levels and/or multi-phase levels, could increase the speed while limiting the necessary increase of the bandwidth. Nevertheless, the problem that arises with this type of modulation is to obtain a good signal-to-noise ratio in the reader-card link.

The increase in damping of the reader antenna causes a large increase in the power necessary for an identical product field level. The increase in damping also reduces the sensitivity to retro-modulation or card load modulation.

The problem arises of finding a new inductive antenna structure, particularly for a communication system reader that offers a sufficiently wide band for very high speed applications without degrading the antenna efficiency, and particularly the field/power ratio in emission and the efficiency in reception.

PRESENTATION OF THE INVENTION

This invention includes the manufacture of an antenna structure with a wide passband, adapted to high speed or very high speed data exchanges.

The invention relates to a signal transmission device by contactless inductive coupling comprising at least one antenna comprising a plurality of conducting links arranged such that there is a projection of the conducting links in the form of a first contour with a first shape and at least one second contour located inside the first contour and in the same plane and with a second shape homothetic with said first shape, and a plurality of segments connecting the first contour and the second contour.

A first plurality of said conducting links forms at least one first conducting circuit through which a first current will circulate, while a second plurality of said conducting links forms at least one second conducting circuit through which a second current will circulate, the first circuit and the second circuit being distinct, in other words not being connected or linked to each other.

The first current passing through said first circuit may possibly be different from the second current passing through the second circuit.

The first current passing through said first circuit may be independent of the second current passing through the second circuit.

Such an antenna structure can result in a wider passband than can be obtained with classical reader antennas, without degrading its performances in terms of the emitted power/consumed power ratio.

Such an arrangement can give negligible coupling between said conducting circuits.

The conducting links may be arranged such that the first circuit and the second circuit both have a zero or approximately zero coupling coefficient, in other words less than 5%, advantageously less than 1%.

To achieve this, the first circuit and the second circuit may comprise a sequence of conducting parts, each conducting part being formed from:
- a first conducting link the projection of which forms a portion of said first contour,
- a second conducting link connected to the first conducting link and the projection of which forms a transition segment between the first contour and the second contour,
- a third conducting link connected to the second conducting link, the projection of which forms a portion of the second contour,
- a fourth conducting link connected to the third conducting link and the projection of which forms a transition segment between the second contour and the first contour.

The segments connecting the first contour and the second contour may each be formed from a superposition or projection of a conducting link of the first circuit and a conducting link of the second circuit.

Said structure may also comprise more than two distinct conducting circuits. Thus, according to one possibility, said structure may comprise three pluralities of conducting links forming three distinct conducting circuits.

According to one possible embodiment, said conducting circuits may be dedicated to emission of signals.

According to another possible embodiment, said conducting circuits may be dedicated to reception of signals.

According to another possible embodiment, the first conducting circuit may be dedicated to emission of signals, while the second conducting circuit is dedicated to reception of signals.

The first circuit may be located in a first plane and the second circuit located in a second plane.

The conducting links in a particular circuit may be included within at least two distinct parallel planes, the electrical continuity between said conducting links in the same circuit being provided by conducting elements through one plane to the other, in other words connecting the first plane and the second plane.

Said segments connecting the first contour and the second contour may be located on straight lines passing through a homothetic centre of said contours.

According to one possible embodiment, said first shape and said second shape may be polygonal or circular or elliptical shapes.

The conducting circuits may be provided with one or several passive components such as one or several resistances and/or one or several capacitors. These passive components may form resonant loops.

Each circuit may be arranged so as to form a resonant loop.

According to one possible embodiment, each circuit may be connected to a generator or associated with or coupled to a generator.

According to one particular embodiment, each circuit may be connected to or associated with or coupled to the same generator.

The generator may be connected to or belong to a loop or a power supply circuit.

According to another possible embodiment, at least one of said circuits may be connected or coupled to a generator, at least one other of said circuits being connected or coupled to a signal reception stage.

According to one possible embodiment of the device in which one or several of said circuits are connected to one or several generators, the device may also comprise at least one connection block between said conducting circuits and said generators, the connection block comprising at least one power divider module and/or at least one phase shift module, and/or at least one impedance matching module.

According to one possible embodiment of the device in which one or several of said circuits are connected to one or several signal reception stages, the device may also comprise at least one connection block between said conducting circuits and said reception stages, the connection block comprising filter means and/or at least one impedance matching module.

The invention also relates to an inductive coupling communication device or contactless communication device, between at least one mobile object, particularly a card or a tag and a reader, comprising a signal transmission device like that defined above.

The intensities of the magnetic fields created by the different conducting circuits in a useful zone close to the antenna, for example a zone in which a user has to present a card to perform a transaction, are equivalent and are in approximately the same directions.

The sum of the fields generated by each of said circuits forms the field applied to a mobile object, for example such as a smart card, and may be sufficient to make a remote power supply and data transmission.

BRIEF DESCRIPTION OF THE DRAWINGS

This invention will be better understood after reading the description of example embodiments given purely for information and in no way limitative, with reference to the appended drawings in which.

The different parts shown in the figures are not necessarily at the same scale, to make the figures more easily legible.

DETAILED PRESENTATION OF PARTICULAR EMBODIMENTS

Figure 1A:
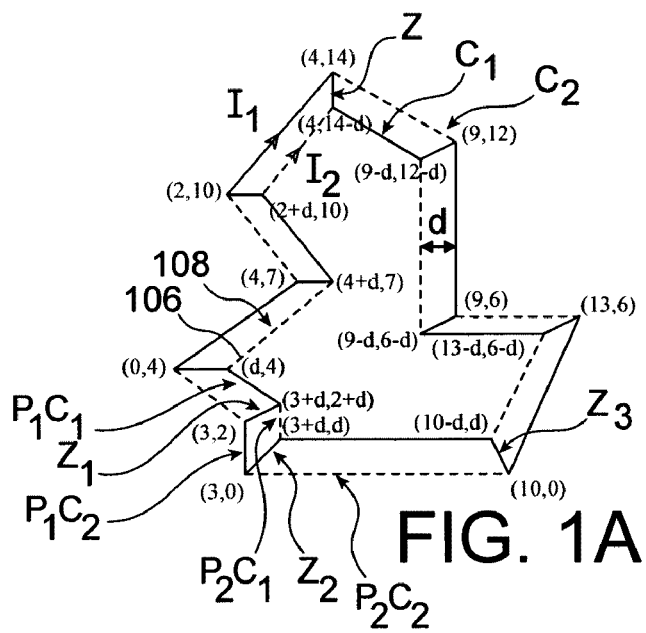
FIGS. 1A, 1B and 1C show a first example arrangement of antenna(s) according to the invention.
Figure 1B:
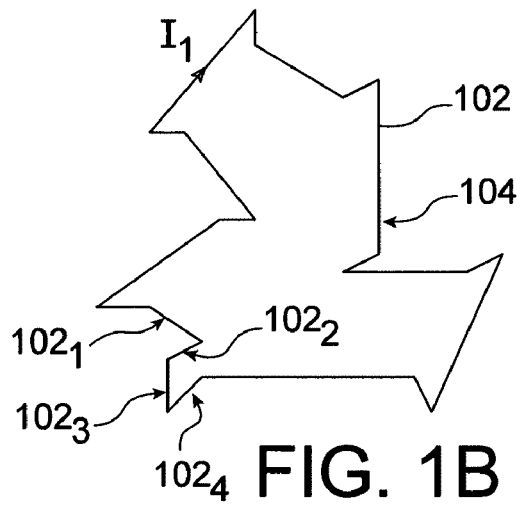
Figure 1C:
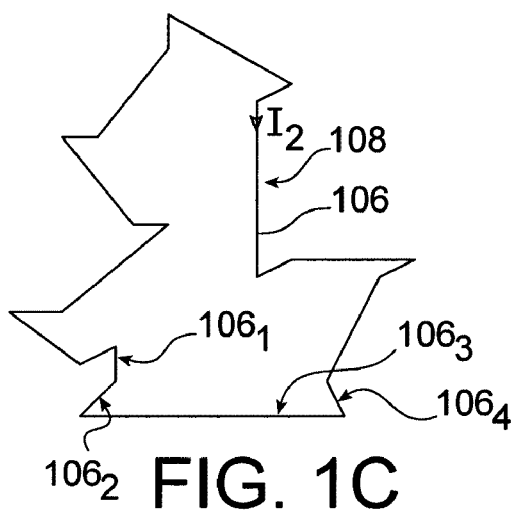

An example of an antenna structure geometry forming one or several antennas of a transmission device according to the invention adapted for emission and/or reception of signals by contactless inductive coupling will now be presented with reference to FIGS. 1A, 1B and 1C.

The device may be integrated into a device called a fixed station, for example such as a reader, an interrogator, a coupler or a PCD designed to read signals emitted by a mobile object, for example such as a card, a transponder, a label or a PICC.

In one example, the antenna structure comprises a set of conducting links forming several resonant circuits, for example 2 resonant circuits.

The conducting elements are distributed in several planes and are arranged such that a projection of the set of conducting links in a single plane forms at least one first closed contour $C_1$ having a first shape, and at least one second closed contour $C_2$ located inside the first contour and having a second shape homothetic with said first shape, and a plurality of conducting links arranged such that segments Z called "transition" segments connect the first contour $C_1$ and the second contour $C_2$.

In this example, a first plurality of conducting links (reference 102 and shown in solid lines in FIGS. 1A and 1B) of the antenna are located in a first plane and form a first circuit 104 through which a first current $I_1$ will circulate, while a second plurality of conducting links (reference 106 and shown in discontinuous lines in FIG. 1A and in solid lines in FIG. 1B) are located in a second plane distinct from the first plane and forming a second circuit 108 through which a second current $I_2$ will circulate.

The first circuit 104 and the second circuit 108 are distinct, in other words they are not linked to each other or connected to each other. These two circuits are independent such that the first current $I_1$ and the second current $I_2$ are independent and may be different from each other depending on the use made of the antenna structure.

In this example, a projection and particularly an orthogonal projection of the first circuit 104 and the second circuit 108 in the same plane, for example parallel to the first plane and to the second plane, creates a first polygon-shaped contour $C_1$ and a second closed conducting contour $C_2$ in the shape of a second polygon identical to the first polygon and inside which the first polygon is located, the second polygon thus being homothetic with the first polygon. Superposition or projection of the first circuit 104 and the second circuit 108 in the same plane also forms transition segments Z each connecting a vertex of the first polygon and a vertex of the second polygon. Said transition segments Z connecting the first contour and the second contour may be located on straight lines passing through a homothetic centre of said contours.

The segments Z connecting the first contour and the second contour may each be formed from a superposition between a conducting link in the first circuit and another conducting link in the second circuit.

The first conducting circuit 104 comprises a sequence of conducting parts, each conducting part being formed from a first conducting link $102_1$ the projection of which forms a portion $P_1C_1$ of the first contour C1, a second conducting link $102_2$ connected to the first conducting link $102_1$ and the projection of which forms a transition segment $Z_1$ between the first contour C1 and the second contour C2, a third conducting link $102_3$ the projection of which forms a portion $P_1C_2$ of the second contour C2, and a fourth link $102_4$ the projection of which forms a transition segment $Z_2$ between the second contour C2 and the first contour C1 (FIGS. 1A and 1B).

The second conducting circuit 108 also comprises a sequence of conducting parts, each conducting part being formed from a first conducting link $106_1$, the projection of which forms a portion $P_2C_1$ of the first contour C1, a second conducting link $106_2$ connected to the first conducting link $106_1$ and the projection of which forms a transition segment $Z_2$ between the first contour C1 and the second contour C2, a third conducting link $106_3$ the projection of which forms a portion $P_2C_2$ of the second contour C2, and a fourth conducting link $106_4$ the projection of which forms a transition segment $Z_3$ between the second contour C2 and the first contour C1 (FIGS. 1A and 1C).

The first contour C1 may thus be formed from a sequence of segments that are alternately a projection of a conducting link 102 belonging to the first circuit 104 and a projection of a conducting link 106 belonging to the second circuit 108.

The second contour C2 may be formed from a sequence of segments that are alternately a projection of a conducting link 106 belonging to the second circuit 108 and a projection of a conducting link belonging to the first circuit 108.

The transition segments Z1 and Z2 connecting the first contour and the second contour in this example correspond to a superposition of a projection of a conducting link in the first circuit and a projection of a conducting link in the second circuit.

This arrangement of the conducting links of circuits 104 and 108 is provided to obtain a coupling coefficient between the first circuit 104 and the second circuit 108 that is zero or practically zero or less than 5%, and advantageously less than 1%.

Such an antenna may for example be designed firstly by choosing the geometry of a first basic contour $C_{01}$ that is selected as a function of a spatial distribution of the magnetic field to be produced in a useful zone close to the antenna.

Then, a second contour $C_{02}$ is created by homothety around the geometry of the first basic contour $C_{01}$. Transition segments passing from one of the basic contours $C_{01}$ and $C_{02}$ to the other are then provided. Geometric modifications to conducting circuits are made from the basic contours $C_{01}$ and $C_{02}$ so as to obtain equilibrium or a sum of the partial mutual inductances equal to practically zero corresponding to a coupling between these circuits equal to almost 0, and the projection of these circuits into the same plane forms said contours $C_{01}$ and $C_{02}$.

The arrangement of the circuits can be adapted so as to obtain zero mutual inductance, taking account of the fact that the mutual inductance of filaments placed parallel to each other and through which a current passes is particularly high when these filaments are close, while the mutual inductance is zero when these filaments are perpendicular to each other.

The magnetic vector potential $\vec{A}$ may be determined in order to calculate the partial mutual inductances between the elementary portions $d\vec{l}_1$, $d\vec{l}_2$ of the circuits.

The magnetic vector potential $\vec{A}$ created by a first circuit with contour $X_1$ through which a current $I_1$ passes at a point M is equal to:

$$\vec{A} = \frac{\mu_0}{4\pi} \cdot I_1 \cdot \oint_{X_1} \frac{d\vec{l}_1}{r}$$

The direction of the vector $\vec{A}$ Close to the first circuit is the same as the direction of current circulation $I_1$.

The flux $\varnothing_{12}$ through the surface occupied by the second circuit is equal to the circulation of the vector $\vec{A}$ on the contour $X_2$ of the second circuit:

$$\phi_{12} = \oint_{X_2} \vec{A} * d\vec{l}_2$$

By combining the expressions, we can obtain the expression for the mutual inductance $M_{12}$ between the two circuits with contours X1 and X2 respectively:

$$\phi_{12} = \frac{\mu_0 * I_1}{4*\Pi} * \oint_{X_2}\oint_{X_1} \frac{d\vec{l}_1}{r} * d\vec{l}_2 = M_{12} * I_1 \quad \text{(Neumann's formula)}$$

$$M_{12} = \frac{\mu_0}{4\pi} \oint_{X_1}\oint_{X_2} \frac{d\vec{l}_1 \cdot d\vec{l}_2}{r}$$

This formula is used to calculate each partial mutual inductance between the different portions of the two basic circuits to determine the global resultant mutual inductance between them. The contribution is zero when the differentials $d\vec{l}_1$ and $d\vec{l}_2$ are perpendicular.

Transition segments between the first contour $C_1$ and the second contour $C_2$ are created, such that portions of circuits contributing to negative partial mutual inductances will compensate for a positive mutual inductance formed by coupling between other portions of the circuits.

Circuits are constructed iteratively so as to obtain equilibrium of partial mutual inductances leading to a zero global mutual inductance between the two circuits.

FIG. 1A shows an example antenna geometry showing the coordinates of the edges of polygons formed by the contours $C_1$ and $C_2$. In this example, the lengths of conducting elements 102, 106 are given in cm, the distance d between the conducting elements is selected to give a global mutual inductance of the order of 1.48 nH corresponding to a coupling coefficient between the two circuits of the order of 0.8%, being of the order of 1.9 cm.

Figure 2A:
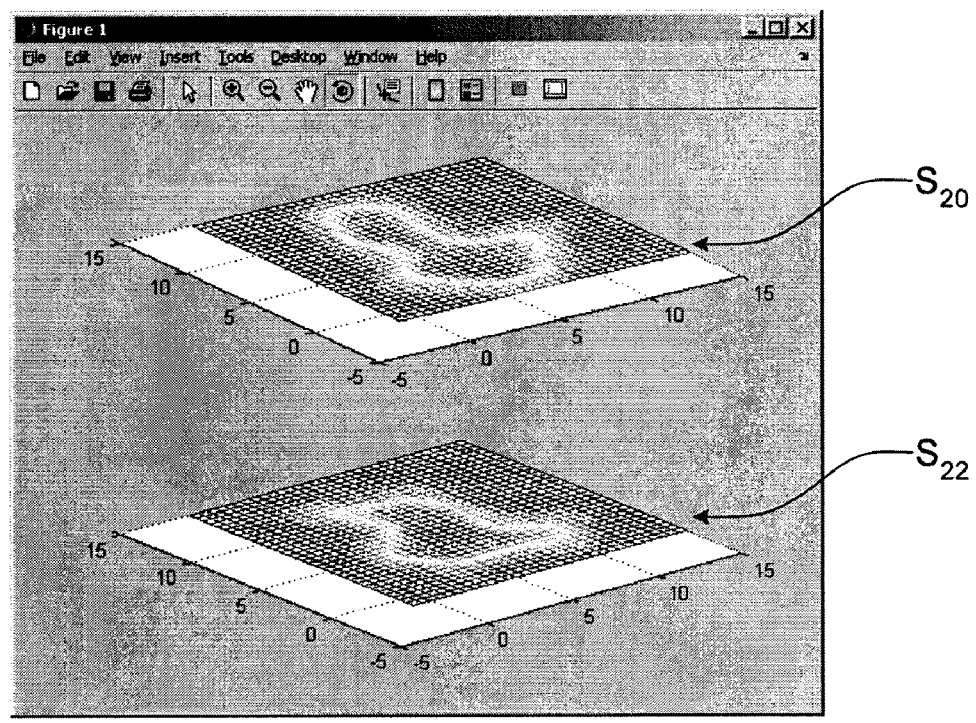
FIGS. 2A and 2B show example radiation diagrams for the first example antenna.
Figure 2B:
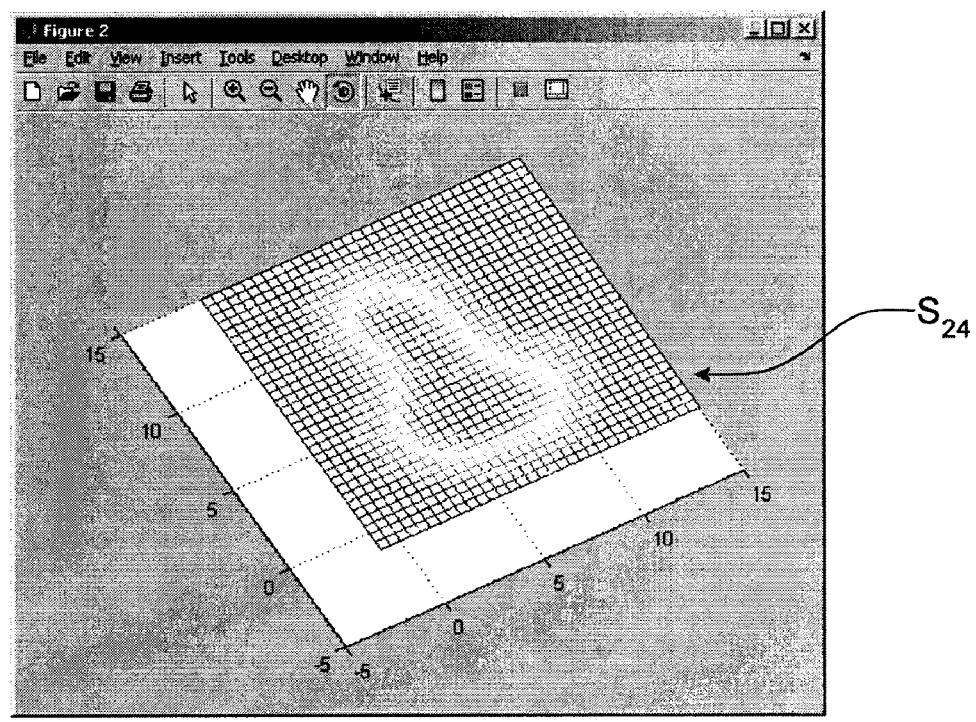

FIGS. 2A and 2B give an example map $S_{20}$ of the magnetic field produced by the first circuit 104 at a height of 3 cm from the antenna plane, an example map $S_{22}$ of the magnetic field produced by the second circuit 108 at a height of 3 cm from the same antenna plane, and an example map $S_{24}$ of the field produced by the two circuits 104 and 108 at a height of 3 cm from the same plane. These maps are obtained assuming that the two planes containing the circuits 104 and 108 are coincident in the same antenna plane. This approximation is made when the spacing between the two circuits 104 and 108 is of the order of 1 mm and the measurement is made at a distance of the order of one or several centimetres.

Other examples of antenna geometries are given in FIGS. 3A-3D.

Figure 3A:
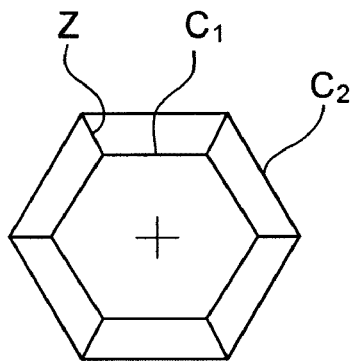
FIGS. 3A, 3B, 3C and 3D show example variants of antenna arrangements in a contactless signal emission and/or reception device according to the invention.

In FIG. 3A, the conducting elements of the antenna are arranged such that the first contour $C_1$ and the second contour $C_2$ are in the shape of a first hexagon and a second hexagon respectively, the transition segments Z connecting the vertices of the polygons to each other.

Figure 3B:
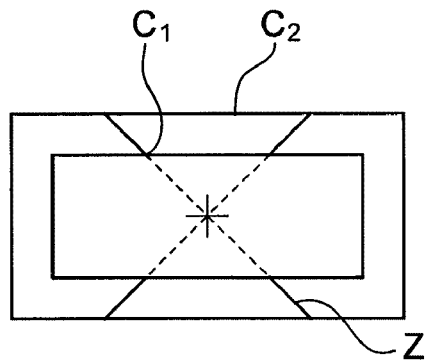

In FIG. 3B, the first conducting contour $C_1$ and the second conducting contour $C_2$ are in the shape of a first rectangle and a second rectangle respectively, with transition segments Z connecting the two rectangles. The second rectangle is a homothetic with the first rectangle. The transition segments are positioned on straight lines passing through the homothetic centre.

Figure 3C:
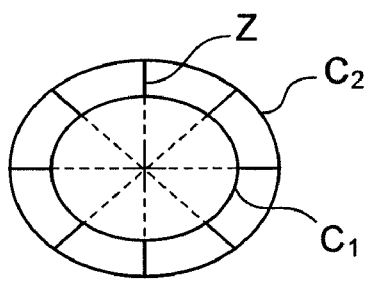

In FIG. 3C, the first conducting contour $C_1$ and the second conducting contour $C_2$ are in the shape of a first ellipse and a second ellipse respectively, transition segments Z connecting the two ellipses. The second ellipse is homothetic with the first ellipse. The transition segments are positioned on straight lines passing through the homothetic centre.

Figure 3D:
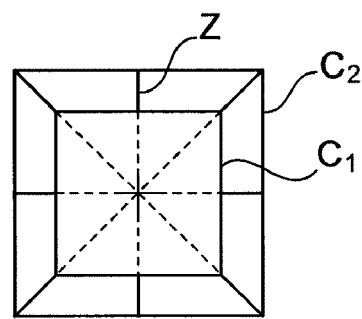

In FIG. 3D, the first conducting contour $C_1$ and the second conducting contour $C_2$ are in the shape of a first square and a second square respectively, the transition segments Z connecting the two squares. The second square is homothetic with the first square. The transition segments are positioned on straight lines passing through the homothetic centre.

By increasing the number of transition segments Z, the total length of the segments participating in cancellation of the mutual is increased, which makes it possible to move the two contours C1 and C2 closer to each other to improve the field distribution and to approach a distribution created by a simple loop.

As in the example described above with reference to FIGS. 1A-1C, the first contour $C_1$ and the second contour $C_2$ and the transition conducting segments Z connecting the first conducting contour $C_1$ and the second conducting contour $C_2$, are made by projection of a set of conducting elements forming a first circuit and another set of conducting elements forming a second circuit in the same plane, the conducting elements being arranged so as to obtain a zero global mutual inductance between the first circuit and the second circuit.

Figure 4:
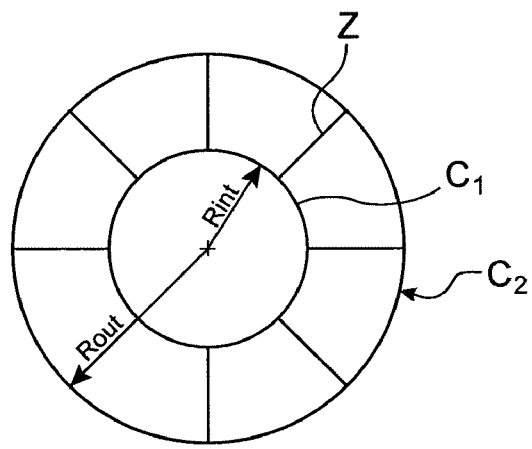
FIG. 4 shows another example of an antenna arrangement in a contactless signal emission and/or reception device according to the invention.

According to another possibility (FIG. 4), the geometry of the antenna according to the invention may be such that the first contour $C_1$ is in the shape of a first circle with a first radius $R_{int}$, while the second contour $C_2$ is in the shape of a second circle with a second radius $R_{out}$ larger than $R_{int}$, the first circle and the second circle being concentric and homothetic. Several transition segments Z with the same length connect the first circle and the second circle and are designed and arranged such that the global mutual inductance between two circuits constructed based on contours $C_1$ and $C_2$ and transition segments is zero. In the example in FIG. 4, the geometry of the antenna comprises 8 transition segments Z between the first contour $C_1$ and the second contour $C_2$.

Figure 5A:
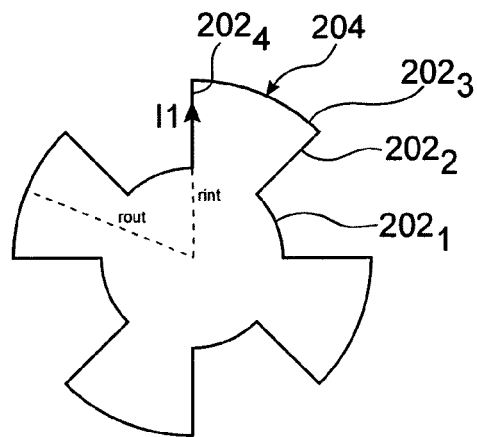
FIGS. 5A and 5B show a first conducting circuit and a second conducting circuit respectively forming an antenna like that shown in FIG. 4, FIGS. 6A, 6B and 6C show a first conducting circuit and a second conducting circuit respectively, and an antenna formed by these two circuits, the circuits being provided with additional passive components.
Figure 5B:
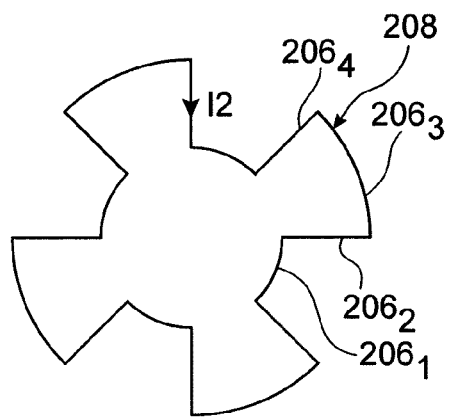

In order to create such a geometry, the antenna may for example be composed firstly of a first circuit 204 located in a first plane and as shown in FIG. 5A, and secondly a second circuit 208 located in a second plane for example above the first plane, and as shown in FIG. 5B. The first circuit 204 may for example be such that it forms a spiral shaped pattern composed of conducting portions or conducting links along a circle arc at the first radius Rint and conducting portions or conducting links along a circle arc at the second radius Rout, each conducting link being connected to two conducting links respectively at the second radius Rout through two conducting links.

The second circuit 208 may form a pattern similar to the first circuit but offset in rotation from the pattern of the first circuit 204, when the two circuits 204 and 208 are seen in a direction parallel to an axis orthogonal to the first plane and to the second plane, for example with an offset of approximately $\pi/8$.

The first circuit 204 comprises a sequence of conducting parts, each conducting part being formed from a first conducting link $202_1$ the projection of which forms a portion of the first contour, a second conducting link $202_2$ connected to the first conducting link $202_1$ and the projection of which forms a transition segment between the first contour and the second contour, a third conducting link $202_3$ the projection of which forms a portion of the second contour, and a fourth conducting link $202_4$ connected to the third conducting link, the projection of which forms a transition segment between the second contour and the first contour (FIG. 5A).

The second circuit 208 also comprises a sequence of conducting parts, each conducting part being formed from a first conducting link $206_1$ the projection of which forms a portion of the first contour, a second conducting link $206_2$ connected to the first conducting link and the projection of which forms a transition segment between the first contour and the second contour, a third conducting link $206_3$ the projection of which forms a portion of the second contour, a fourth conducting link $206_4$ connected to the third link and the projection of which forms a transition segment between the second contour and the first contour (FIG. 5B).

In the examples given above, the conducting circuits are in the form of closed loops.

According to one embodiment of this invention, it would be possible to provide an antenna structure with conducting circuits for example with a similar arrangement to one of the arrangements described above but in the form of so-called "quasi-closed" loops, in other words not absolutely closed but in which access conducting links of conducting circuits or access terminals of conducting circuits, in other words the links or terminals designed to carry current in or out, are located adjacent to each other and arranged such that they do not contribute to radiation from the antenna.

Passive components may be added to the first circuit 204 and/or to the second circuit 208. These passive components may for example comprise one or several resistances and one or several capacitors. Passive components are provided in this example such that the circuits 204 and 208 respectively form a resonant loop.

Currents $I_1$ and $I_2$ in circuits 204, 208 run through them in the same direction, so as to contribute to cooperative fields in the same useful zone facing the structure that they form. The transition segments 206 are arranged so as to enable a zero mutual inductance condition.

Figure 6A:
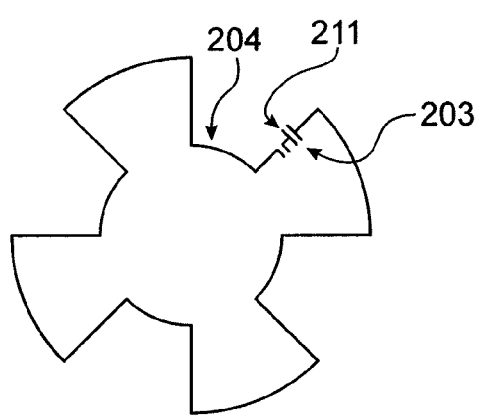
Figure 6B:
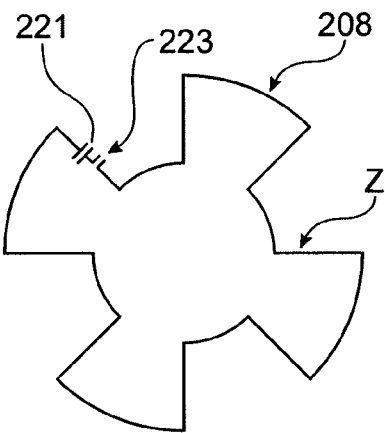
Figure 6C:
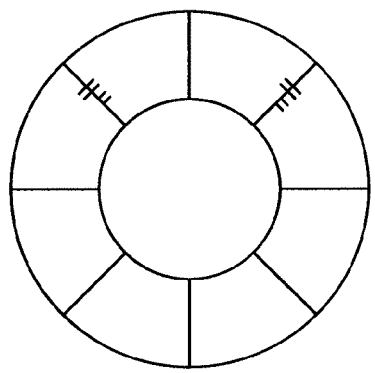

The first circuit 204 in FIG. 6A is also provided with passive components, for example it is provided with means forming a capacitor 211 and means forming a resistance 213, while in FIG. 6B the second circuit 208 is also provided with passive components, for example means forming a capacitor 221 and means forming a resistance 223. FIG. 6C is a representation of a superposition or projection of two circuits 204, 208 provided with passive elements, in the same plane.

A structure like that illustrated above in FIGS. 6A, 6B and 6C, with 8 transition segments Z will need a contour with outside radius Rout of the order of 8.5 cm for example and a contour with inside radius Rint of the order of 5.35 cm, while a radius Rint of the order of 6.13 cm will be required for a structure with 20 transition segments.

Figure 7A:
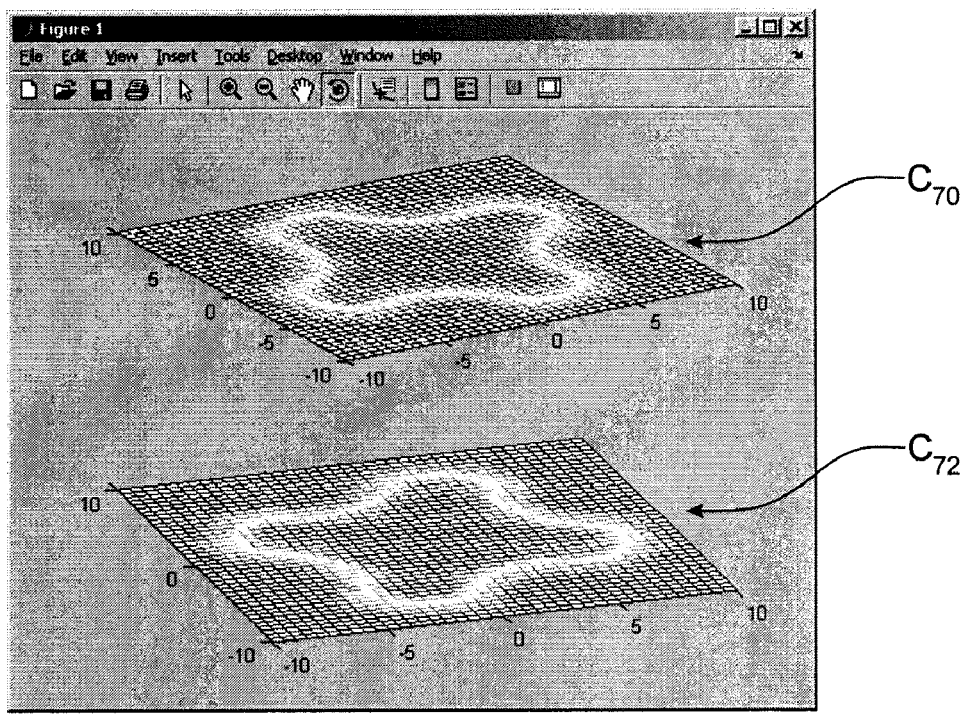
FIGS. 7A and 7B show examples of magnetic field distributions obtained by using an example antenna according to the invention.
Figure 7B:
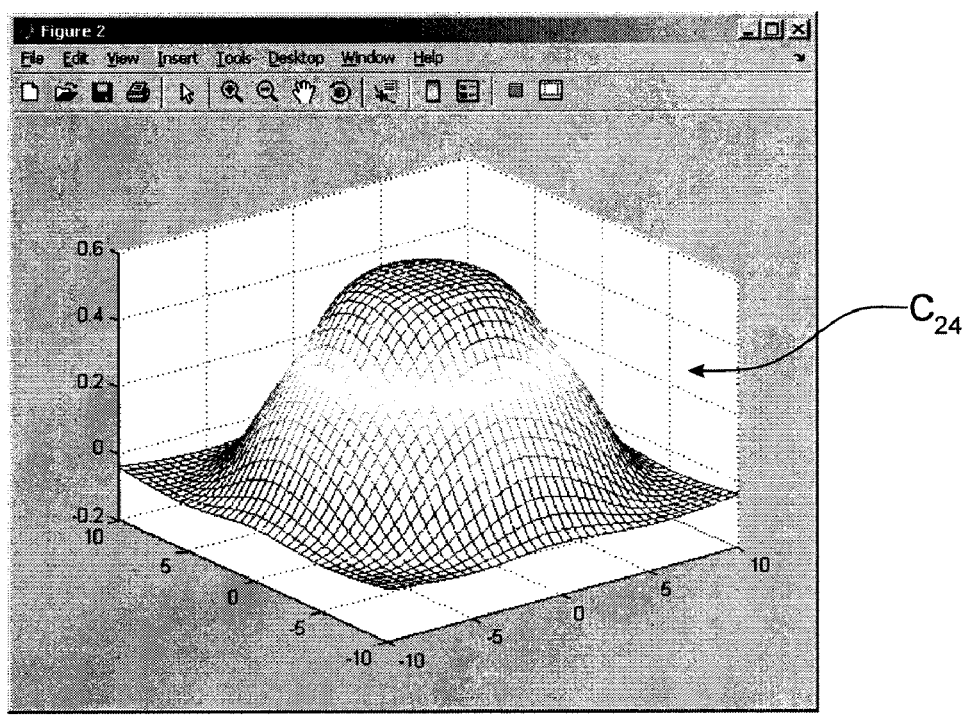

FIGS. 7A and 7B give an example distribution $C_{70}$ of the magnetic field produced by the first circuit 204 at a height of 3 cm from the antenna plane, an example distribution $C_{72}$ of the magnetic field produced by the second circuit 208 at a height of 3 cm, and a distribution $C_{74}$ representative of the accumulated fields produced by the two circuits 204, 208.

Figure 8A:
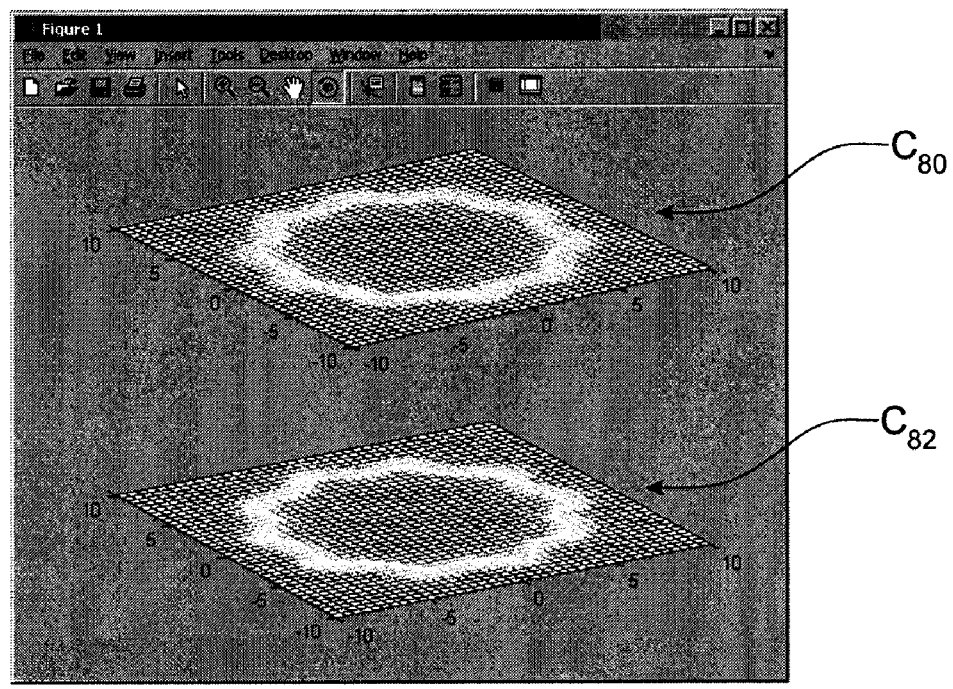
FIGS. 8A and 8B, show examples of magnetic field distributions obtained by using another example antenna according to the invention.
Figure 8B:
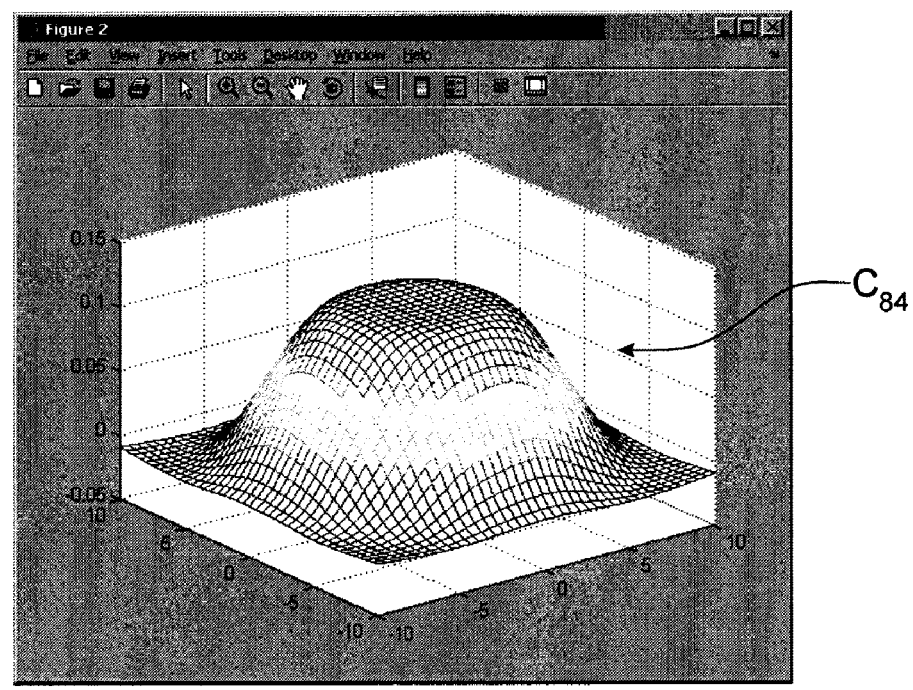

FIGS. 8A and 8B give an example distribution $C_{80}$ at a height of 3 cm from the antenna plane, of the magnetic field produced by an antenna circuit of the type in the first circuit 204 but comprising 10 petals, an example distribution $C_{82}$ at a height of 3 cm, of the magnetic field produced by another antenna circuit such as the second circuit 208, and a distribution $C_{84}$ representative of a superposition of the field produced by said circuit and said other circuit.

These maps are obtained assuming that the two planes containing the circuits 104 and 108 are coincident in the same antenna plane.

By increasing the number of transition segments Z per circuit, a better conformity of the magnetic field is obtained for this production mode in the useful antenna emission zone.

For contours with other more basic geometric contours, for example like those shown in FIGS. 1 and 3A to 3D, one possible means of improving the uniformity of the magnetic field would be to increase the number of transition segments (reference Z in these figures) between the first contour $C_1$ and the second contour $C_2$.

Figure 9:
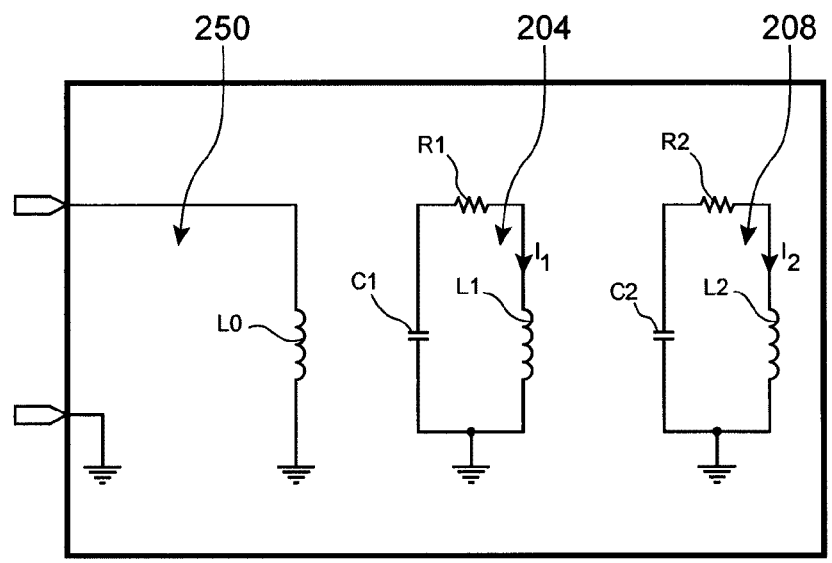
FIGS. 9 and 10 show an equivalent electrical circuit for an example of an antenna according to the invention and current response curves as a function of the frequency for such an antenna, respectively.

FIG. 9 shows an equivalent electrical circuit for an example antenna device according to the invention comprising two circuits like those described above with reference to FIGS. 6A and 6B.

The first circuit 204 forms a first resonant loop with an equivalent inductance $L_1$ for example of the order of 0.59 µH, an equivalent capacitance C1 for example of the order of 255 pF, an equivalent resistance R1 for example of the order of 2*L1*85.2e6/Q in which Q is the quality factor, for example of the order of 35.

The second circuit 208 forms a second resonant loop with an equivalent inductance $L_2$ for example of the order of 0.59 µH, an equivalent capacitance C2 for example of the order of 210 pF, an equivalent resistance R2 for example of the order of 2*L2*85.2e6/Q in which Q is the quality factor, for example of the order of 35.

The capacitance C1 and the resistance R1 correspond to passive components inserted in the first circuit 204. The inductance L1 corresponds to the equivalent inductance of all conducting links making the first circuit 204. Similarly, the capacitance C2 and the resistance R2 correspond to passive components inserted in the second circuit 208. The inductance L2 corresponds to the equivalent inductance of all conducting links making the second circuit 208.

Each of the two resonant loops may be coupled to a power supply loop 250 comprising means forming an LF generator comprising an equivalent inductance $L_0$ of the order of 0.55 µH and arranged to achieve identical coupling for each of the two loops 204 and 208.

The coupling coefficient $k_{01}$ between the power supply loop 250 and the first resonant loop 204 may be equal to the coupling coefficient $k_{02}$ between the power supply loop 250 and the second resonant loop 208. The coupling coefficients $k_{01}$ and $k_{02}$ may for example be of the order of 0.175.

The coupling coefficient between the two resonant loops 204 and 208 $k_{12}=M_{12}/\sqrt{(L_1*L_2)}$ where $M_{12}$ is the mutual inductance coefficient, may be zero or at most such that $k_{12} \leq 0.01$.

Figure 10:
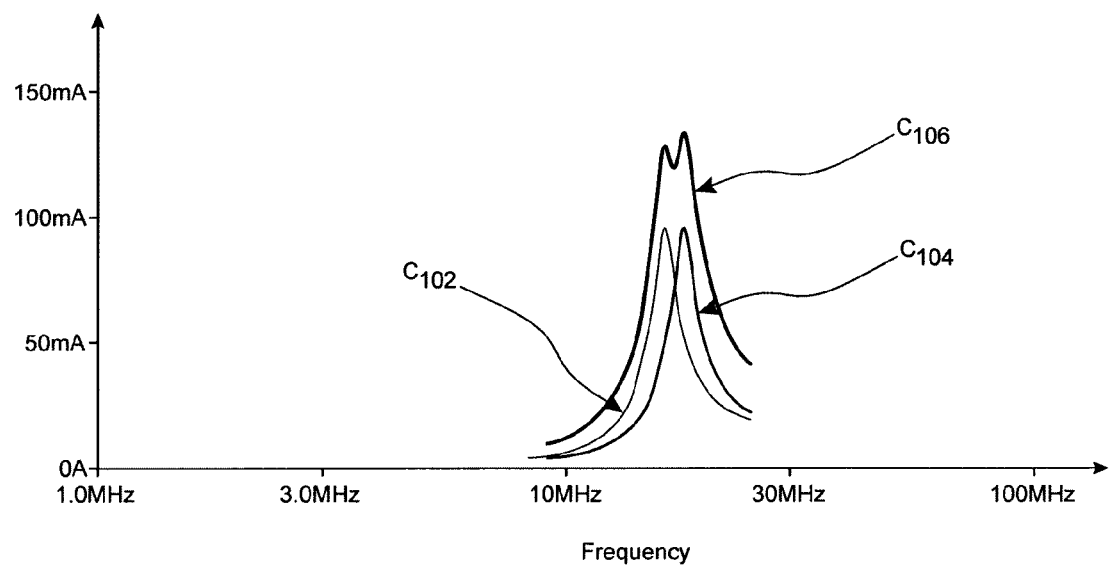

FIG. 10 shows examples of current response curves $C_{102}$, $C_{104}$, $C_{106}$ as a function of the frequency for the first resonant loop 204, the second resonant loop 208, and for the two loops 204 and 208.

The device according to the invention can give a larger passband than classical antenna structures while keeping an equivalent emitted field/power ratio. Even if the same frequency is chosen as the resonant frequency of the two loops 204 and 208, the passband obtained would be larger than the passband of classical antenna structures.

Figure 11:
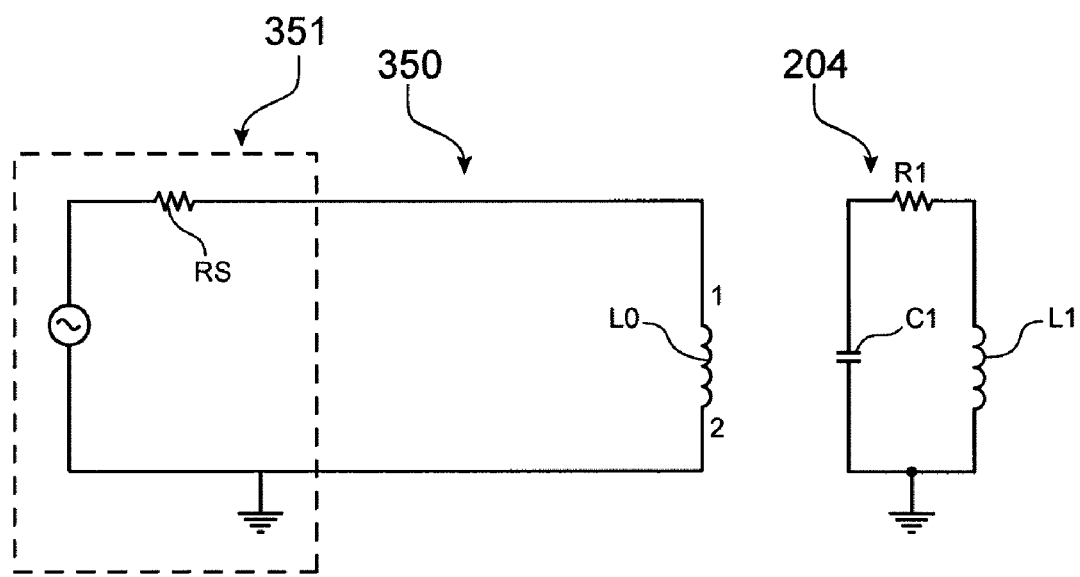
FIGS. 11 and 12 show an equivalent electrical circuit for a standard resonant loop and response curves as a function of the frequency for such a loop, respectively.

FIG. 11 shows an equivalent electrical circuit of an antenna device comprising a power supply loop 350 coupled to a single resonant loop similar to the first resonant loop 202.

The power supply loop 350 is connected to means 351 forming an LF generator outputting a voltage $V_1$, in series with a resistance Rs for example of the order of 50Ω, and an inductance loop $L_0$ for example of the order of 0.55 µH being connected with the generator and the resistance Rs.

Figure 12:
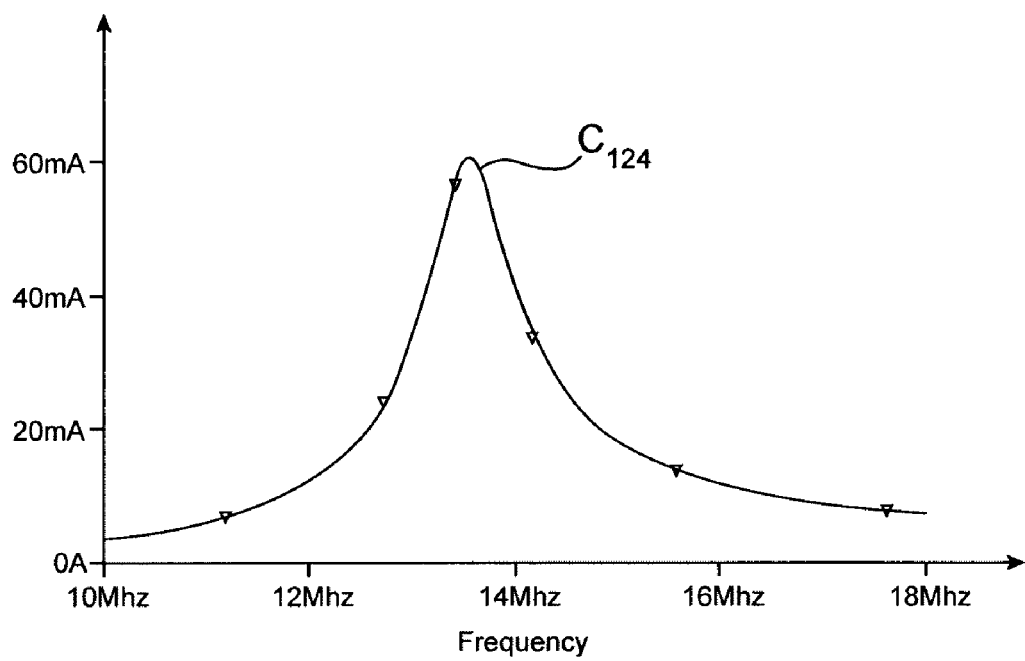

FIG. 12 shows the current response curve $C_{124}$ as a function of the frequency, the equivalent inductance $L_0$ of the power supply circuit 350, and the equivalent inductance $L_1$ of the first loop 204.

With a single resonant loop 204, a current of the order of 60 mA can be obtained to produce the required magnetic field for a consumed power of the order of 5 mW, and a band width at −3 dB of the order of 0.76 MHz.

Figure 13:
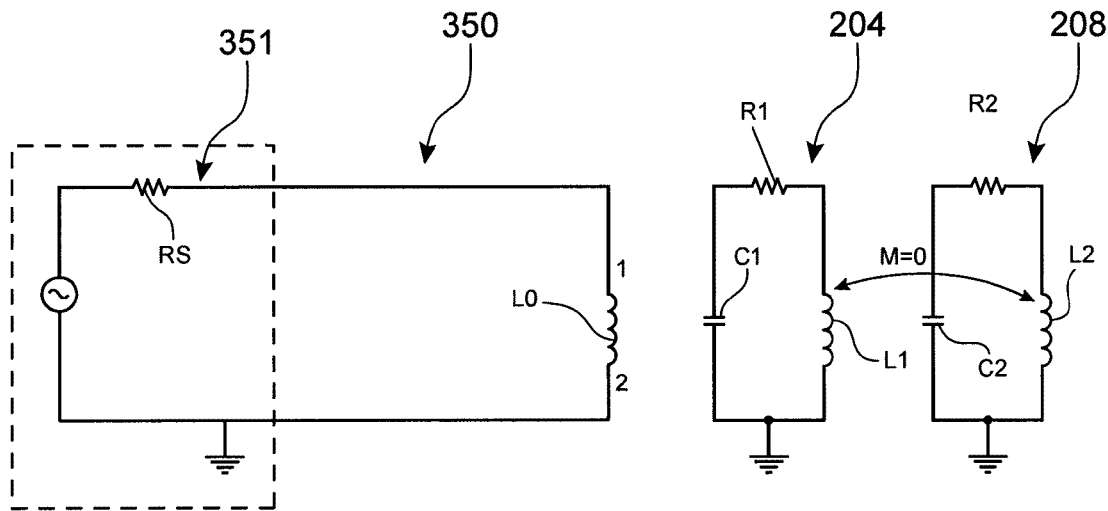
FIGS. 13 and 14 show an example of an equivalent electrical circuit for an example of an antenna according to the invention formed of 2 resonant loops, and response curves as a function of the frequency for such loops, respectively.

By using the two loops 204 and 208 (FIGS. 5A, 5B) as shown in FIG. 13, coupled to the power supply circuit 350 and in zero mutual inductance, a current of the order of 60 mA can be obtained to produce the required magnetic field for a consumed power of the order of 5 mW, and a bandwidth at −3 dB of the order of 1.64 MHz. With a 2-circuit antenna, the passband can thus be doubled without reducing the emitted power and without increasing the consumed power.

Figure 14:
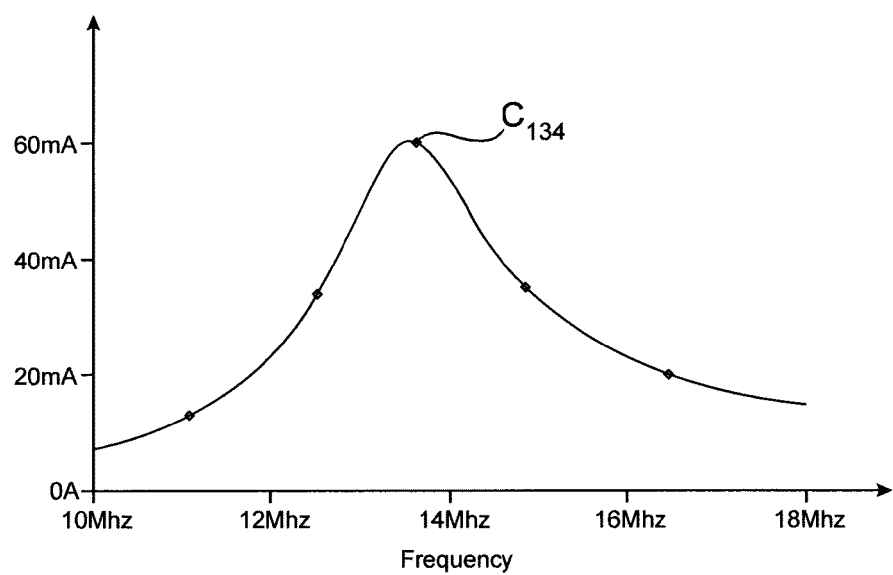

FIG. 14 shows a current response curve $C_{134}$ as a function of the frequency, the equivalent inductance $L_0$ of the power supply circuit 350.

The antenna device according to this embodiment of the invention is not limited to an embodiment with two resonant circuits or two resonant loops and it may comprise more than two resonant circuits or resonant loops.

Figure 15:
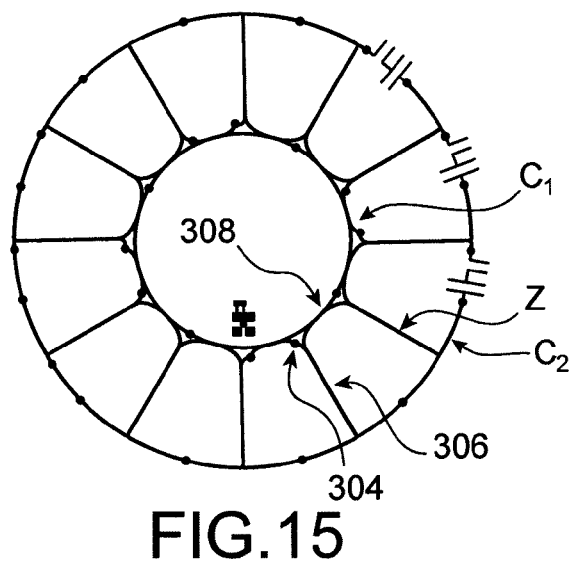
FIGS. 15, 16A and 16B show an example of an antenna according to the invention with 3 resonant loops.

Another example of the antenna device with 3 resonant loops is shown in FIG. 15. This device comprises a set of conducting links distributed in two planes and arranged such that a projection of the conducting links in the same plane is in the form of at least one first conducting contour $C_1$ with a first circular shape, and at least one second conducting contour $C_2$ located inside the first contour and with a second circular shape homothetic with said first circular shape, and a plurality of transition segments Z connecting the first contour $C_1$ and the second contour $C_2$.

In this example, a first circuit 304, a second circuit 306 and a third circuit 308 are each formed from a plurality of conducting links located in a first plane of a plurality of conducting links located in a second plane, and a plurality of conducting links (not shown), for example in the form of vias or through conducting elements connecting links in the first plane and in the second plane.

Figures 16A, 16B:
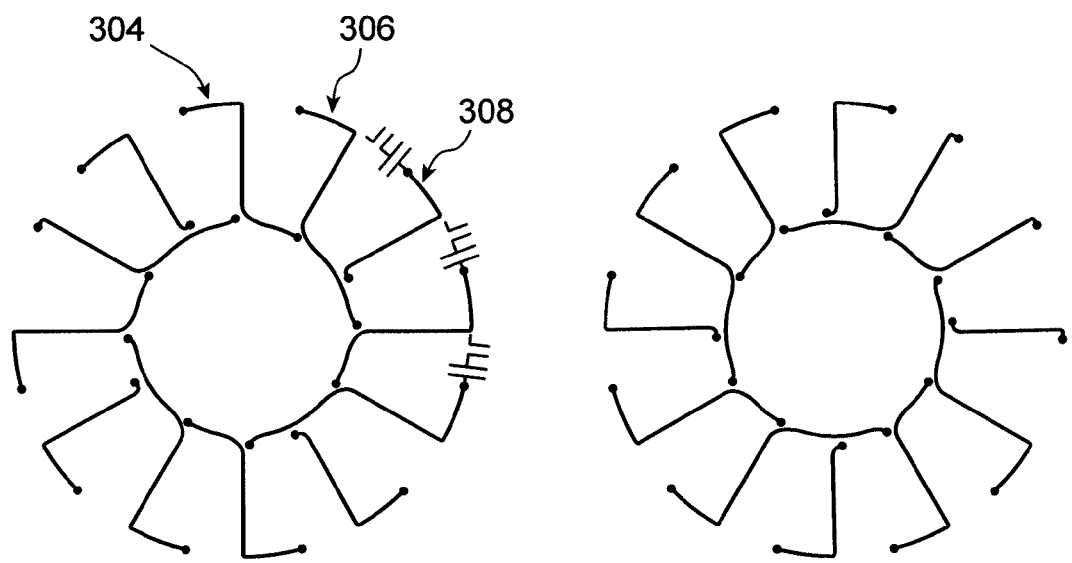

FIG. 16A shows conducting links located in the first plane, while FIG. 16B shows conducting links located in the second plane.

A superposition or projection of the first circuit 304, the second circuit 306, the third circuit 308 in the same plane, for example parallel to the first plane and the second plane, forms the first conducting contour $C_1$, the second conducting contour $C_2$ and the segments Z connecting the first contour and the second contour. The circuits 304, 306, 308 are arranged so as to have a coupling coefficient equal to approximately zero, or at least less than 5%, advantageously less than 1%.

An inductive antenna according to the invention may be used in contactless data exchange applications, particularly for applications in which information has to be transmitted at very high speed, for example of the order of or greater than 1 Mbit/s, for example in applications that exchange large files such as image files, encrypted data files, biometric data.

Other example embodiments of the device according to the invention are described below with reference to FIGS. 17 to 25. In these examples, each circuit forming the antenna(s) is represented by an equivalent circuit R, L, C in series, for example corresponding to the structure shown in FIGS. 6A and 6B. The resistances R and C are the resistances of passive components inserted in the circuit. The inductance L corresponds to the inductance of the conducting links forming the circuit.

In all these examples, the conducting circuits are quasi-closed loops of conducting links, the two ends of a loop forming its access terminals. These access terminals are connected to a power supply or reader circuit as described below.

Figure 17:
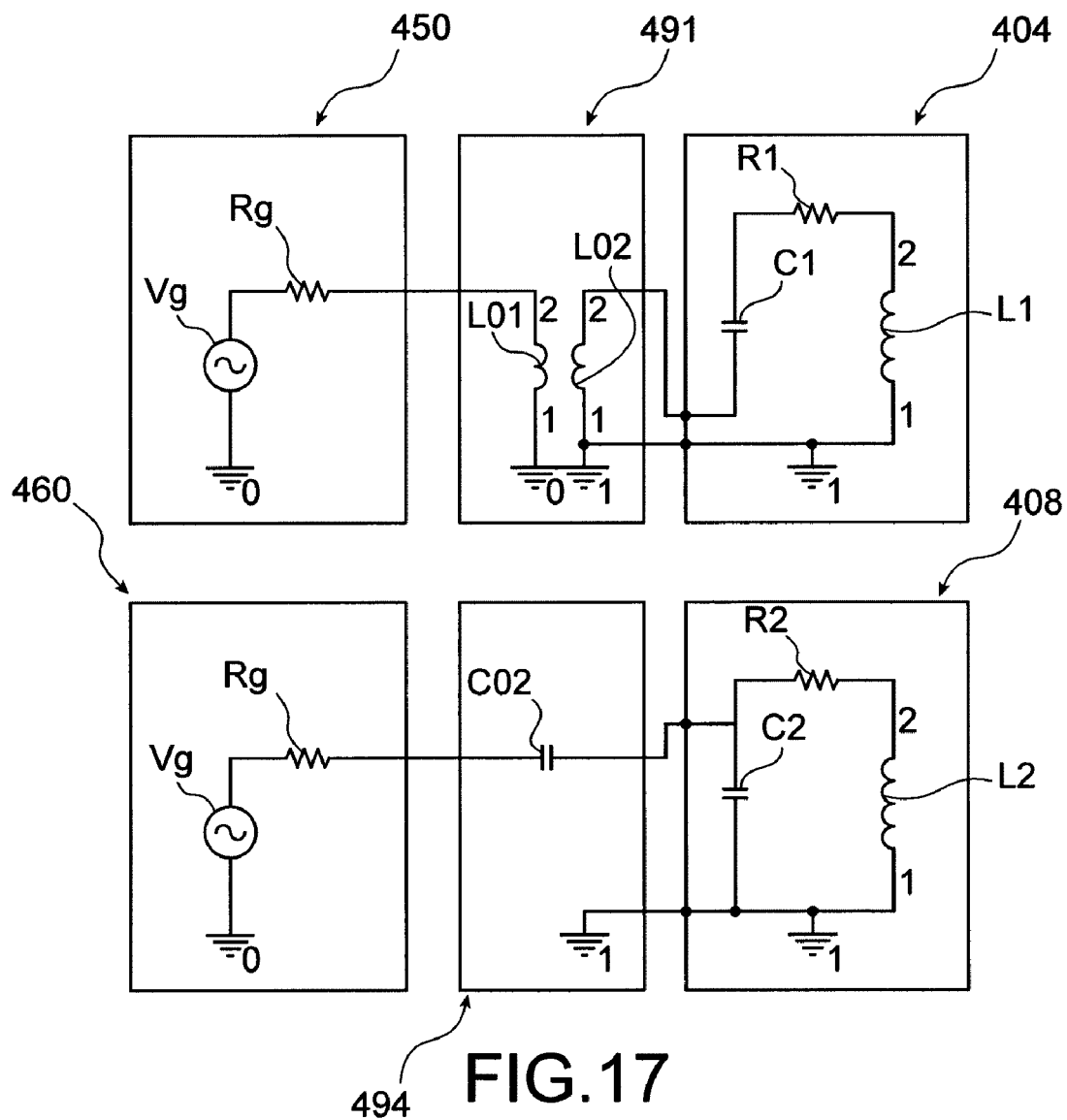
FIG. 17 shows an example of an equivalent electrical circuit for a signal emission device comprising at least one example antenna structure according to the invention with 2 resonant circuits, of which a first circuit is coupled to a first generator and a second circuit is connected to a second generator.

FIG. 17 shows another example of an equivalent electrical circuit of a device forming at least one antenna structure according to the invention comprising two independent or distinct conducting circuits.

A first conducting circuit 404 forms a first resonant loop that comprises an inductance $L_1$, a capacitance $C_1$ and a resistance $R_1$. This first circuit 404 may for example have an arrangement of the type shown in the circuit 204 in FIG. 6A with added passive components $R_1$ and $C_1$.

Similarly, a second conducting circuit 408 forms a second resonant loop with an inductance $L_2$, a capacitance $C_2$, and a resistance $R_2$.

The first circuit 404 is connected to a generator 450 through a connection block 491. The connection block 491 in this example is a transformer comprising a primary inductance L01 connected to the generator and a secondary inductance L02 connected to the access terminals of the first circuit 404.

The second circuit 408 is connected to another generator 460 through a connection block 494 comprising a capacitance CO2. The capacitance CO2 is connected firstly to the generator 460 and secondly to a first electrode of the capacitance C2 of the second circuit 408 through a first access terminal of circuit 408. The second electrode of the capacitance C2 is connected to the ground present in the connection circuit through a second access terminal of circuit 408.

Figure 18:
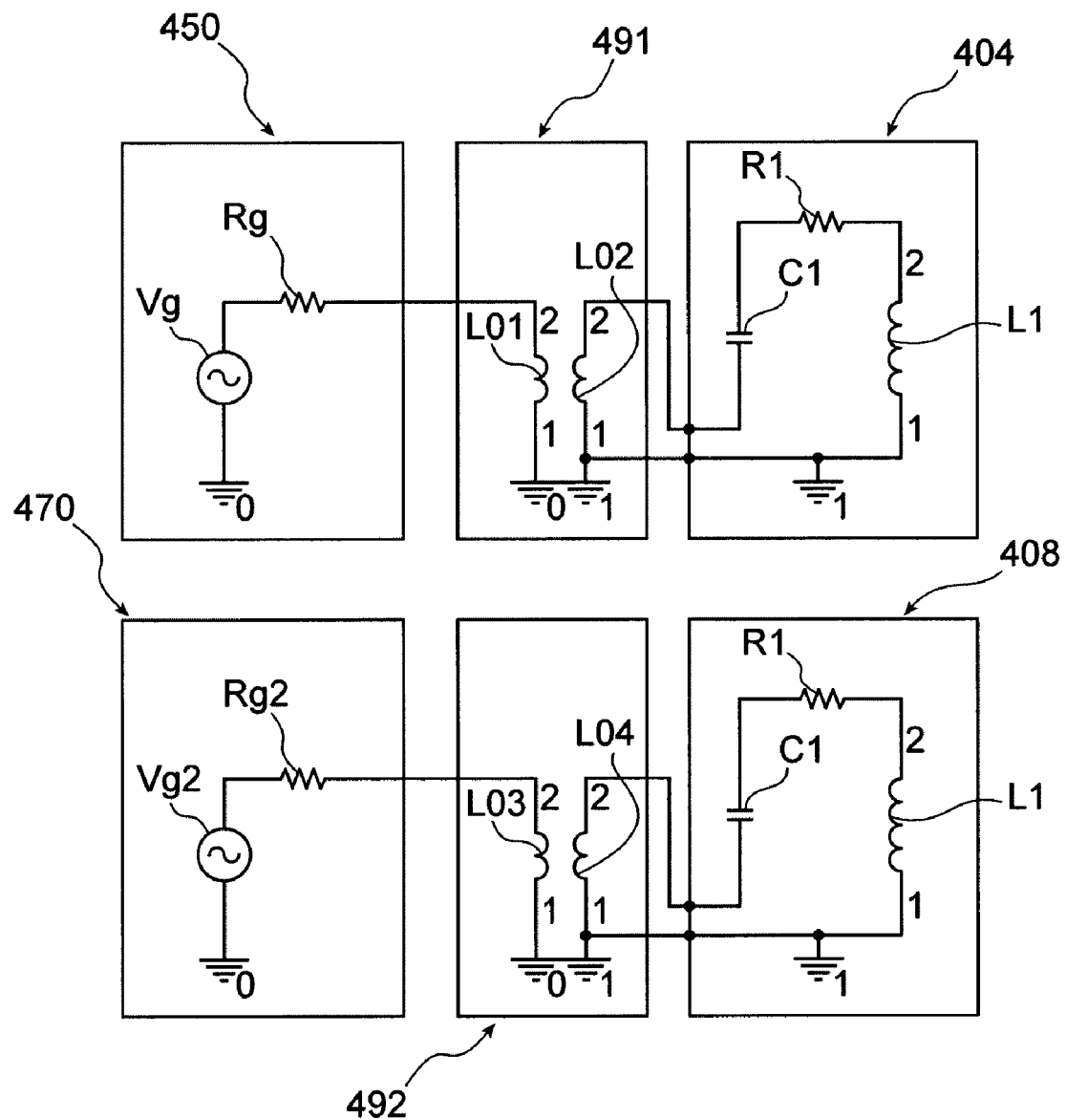
FIG. 18 shows another example of an equivalent electrical circuit for a signal emission device comprising at least one antenna structure according to the invention with two resonant circuits, of which a first circuit is coupled to a first generator and a second circuit is coupled to a second generator.

FIG. 18 shows a variant of the above example. As before, a first circuit 404 is connected to a generator 450 through a transformer type connection block 491. A second circuit 408 is connected to a generator 470 through a connection block 492 of the transformer type with a structure identical to the structure of the connection block 491 and comprises a primary inductance L03 connected to the generator 470 and a secondary inductance L04 connected to the access terminals of the second circuit 408.

Figure 19:
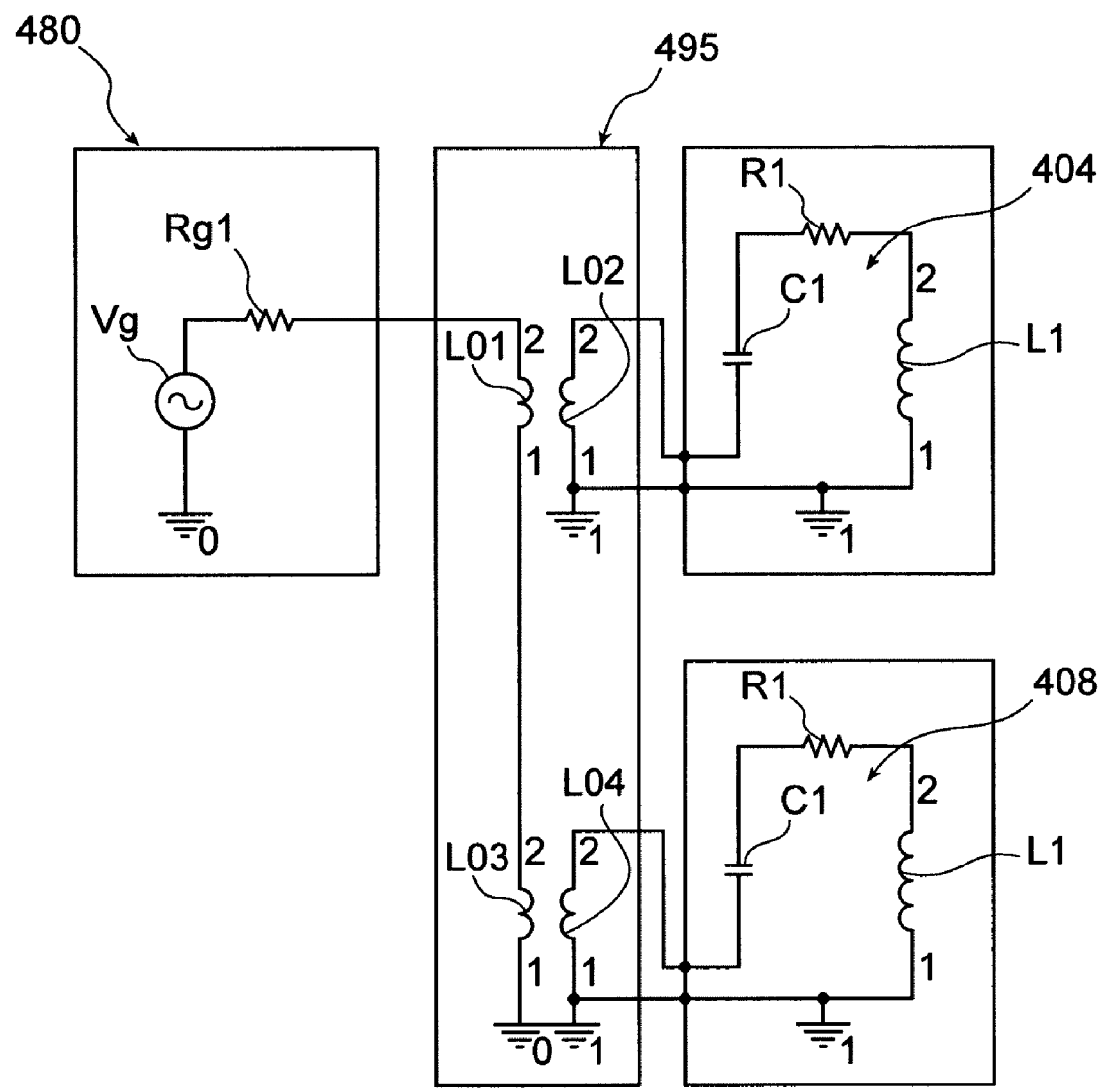
FIG. 19 shows another example of an equivalent electrical circuit for an example signal emission device comprising at least one antenna structure according to the invention with two resonant circuits coupled to the same generator.

FIG. 19 shows a variant of the above mentioned device, the device comprises a single generator 480 and a "common" connection block 495 connecting this generator 480 to the first conducting circuit 404 and to the second conducting circuit 408 using a transformer comprising two primary windings L01 and L03 in series connected to the generator and two secondary windings L02 and L04 connected to the first circuit 404 and the second circuit 408 respectively.

Figure 20:
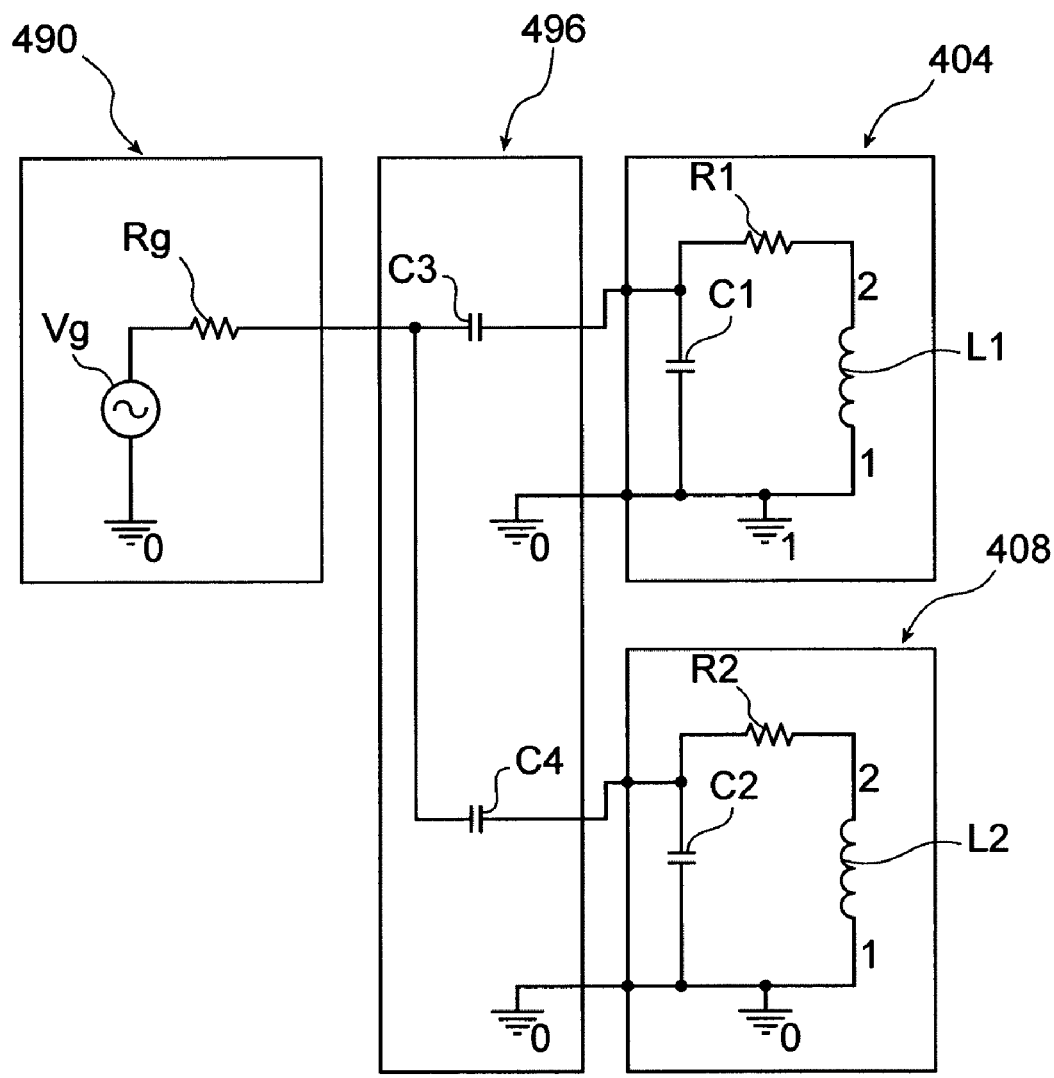
FIG. 20 shows another example of an equivalent electrical circuit for an example signal emission device comprising at least one antenna structure according to the invention with two resonant circuits connected to the same generator.

In another variant of the above devices shown in FIG. 20, the device comprises a single generator 490 and a single common connection block 496 of the capacitance type connecting this generator 490 to a first circuit 404 and a second circuit 408. The connection block comprises a first capacitance C3 connected to a first electrode of the capacitance C1 of the first circuit 404 through an access terminal of the first circuit, and another capacitance C4 connected to a first electrode of the capacitance C2 of the second circuit 404 through an access terminal of the second circuit. The second electrodes of the capacitances C1 and C2 of the first and second circuits are connected to the ground through an access terminal of each circuit.

In the above mentioned examples, the first conducting circuit and the second conducting circuit are used to emit electromagnetic signals through the antenna structure corresponding to inductances L1 and L2, provided that they are connected to a generator. The two circuits 404 and 408 may be used to emit signals, particularly if it is required to emit on a wide passband.

According to one variant use of the above mentioned circuits, the first conducting circuit may be used as an emission antenna for electromagnetic signals, and the second conducting circuit can be used as a signal reception antenna. The emission and the reception channels may comprise blocks in common, for example a transformer type connection block, or they may be dissociated as in the example described below.

Figure 21:
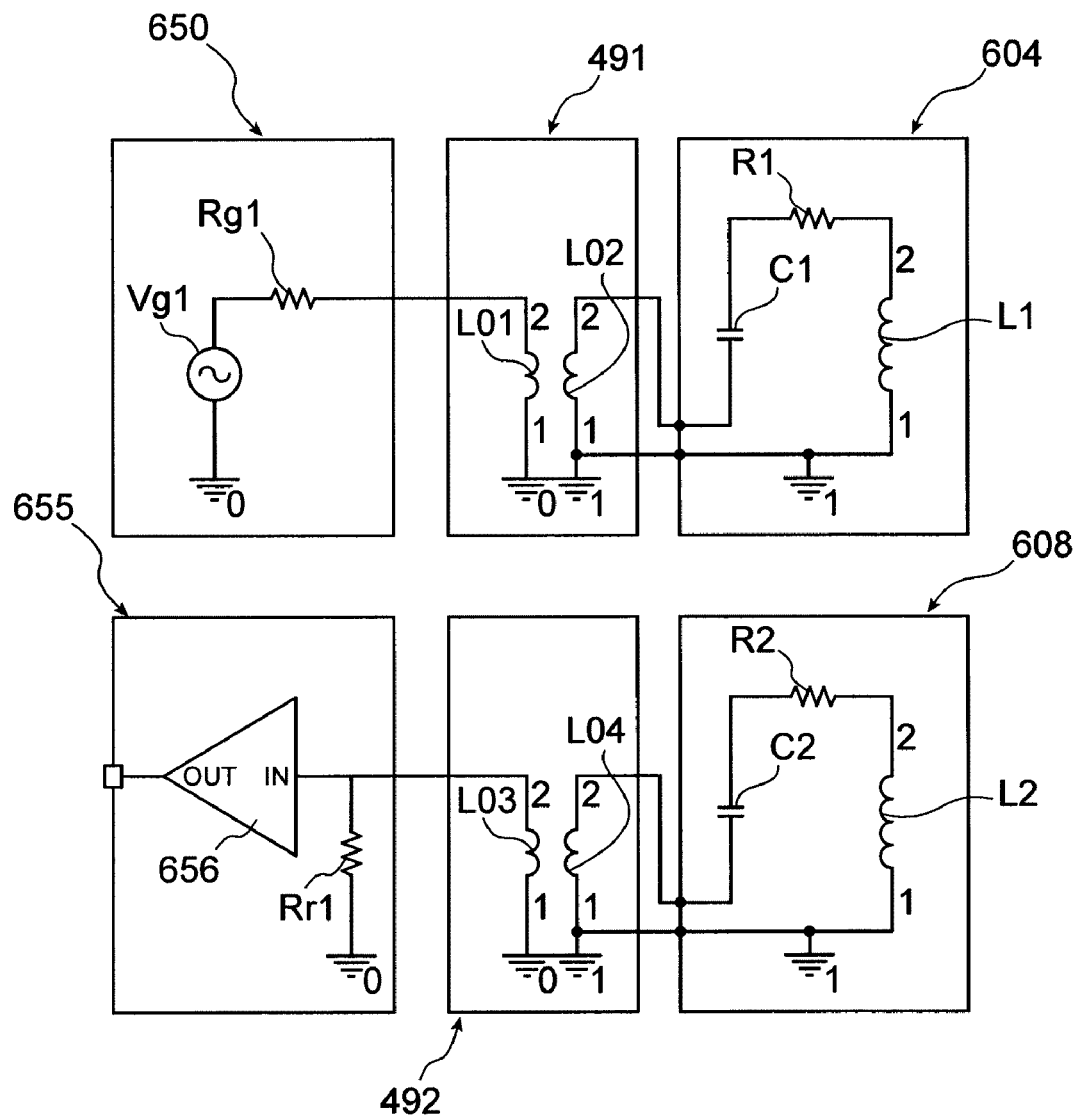
FIG. 21 shows an example of an equivalent electrical circuit for an example signal emission and reception device comprising at least one antenna structure according to the invention with 2 resonant circuits, including a first circuit dedicated to emission of signals and coupled to a first generator and a second circuit dedicated to reception of signals and coupled to a reception stage or circuit.

The device in FIG. 21 comprises distinct emission and reception channels. A first circuit 604 and a second circuit 608, with an arrangement that may for example be of the type shown in FIGS. 6A-6B, are connected to a generator 650 through a first transformer type connection block 491 and to a reception stage 655 through a second transformer type connection block 493, respectively. In particular, the reception stage 655 may comprise means forming an amplifier 656.

In this example, the first and second circuits in the device form the equivalent of two antennas, to the extent that their functions are different, to emit or receive electromagnetic signals.

According to one embodiment of a device according to the invention, particularly in the case of an RFID type application, the same set of conducting circuits may be used to receive and emit signals. The connection block(s) to these circuits will be connected firstly to reception means and secondly to emission means, the electronic components possibly being common to the emission and reception means.

Figure 22:
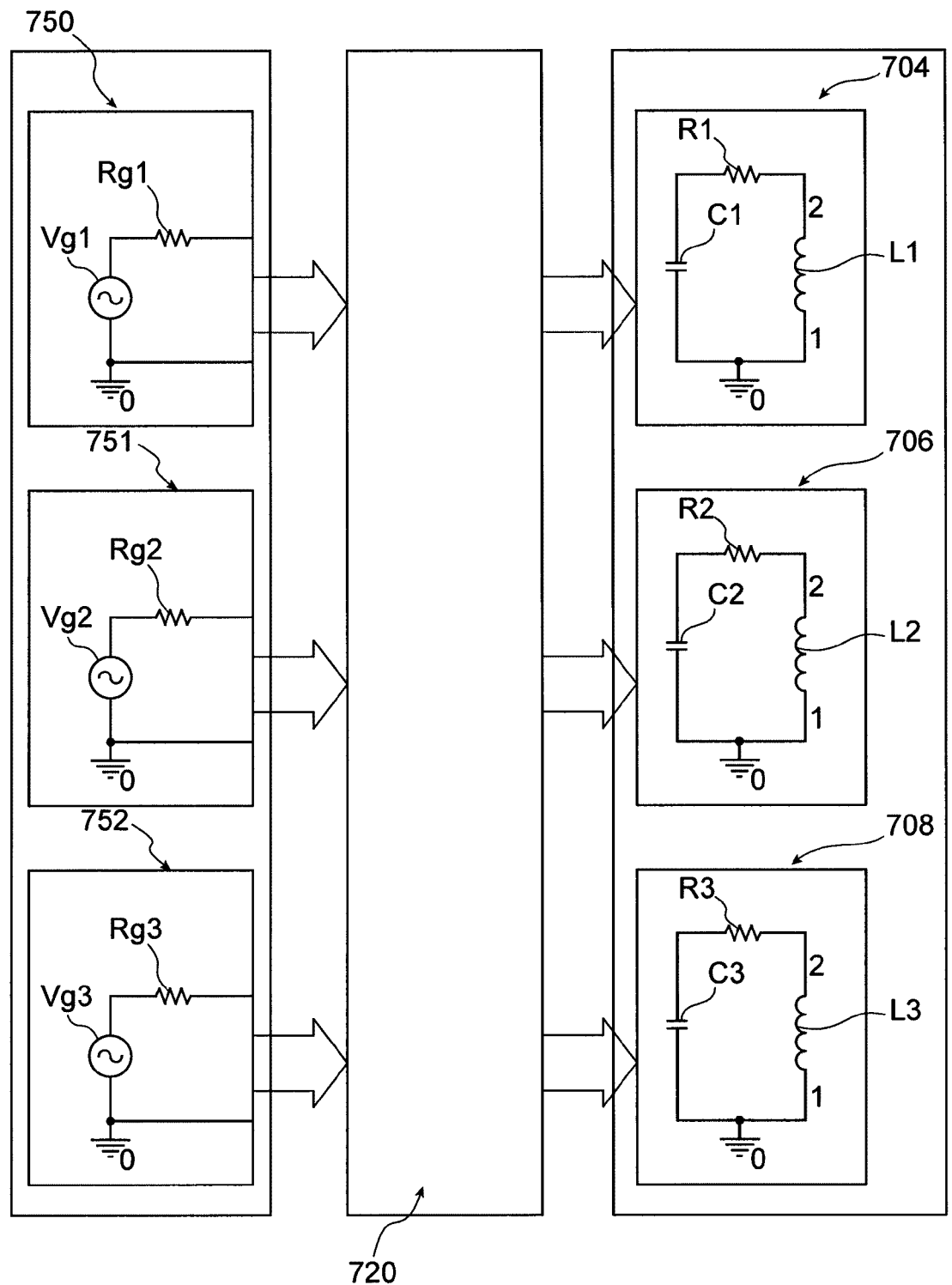
FIG. 22 shows an example of an equivalent electrical circuit for an example signal emission and reception device comprising at least one antenna structure according to the invention with 3 resonant circuits, each connected to a generator through a connection block.

FIG. 22 shows another example device. This device comprises 3 generators 750, 751 and 752, and 3 circuits 704, 706 and 708 that can form resonant loops.

Circuits 704, 706, 708, may have an arrangement similar to the arrangement of circuits 304, 306 and 308 described for example with reference to FIGS. 16A-16B.

The first circuit 704 has an inductance $L_1$, an equivalent capacitance $C_1$, an equivalent resistance $R_1$, and a capacitance C1, while the second circuit 706 has an inductance L2, an equivalent resistance $R_2$, and a capacitance C2, and the third circuit 708 has an inductance L3, an equivalent resistance $R_3$, and a capacitance C3.

The connection between firstly the first circuit 704, the second circuit 706 and the third circuit 708, and secondly the generators 750, 751 and 752, is made through a connection block 720.

Figure 23:
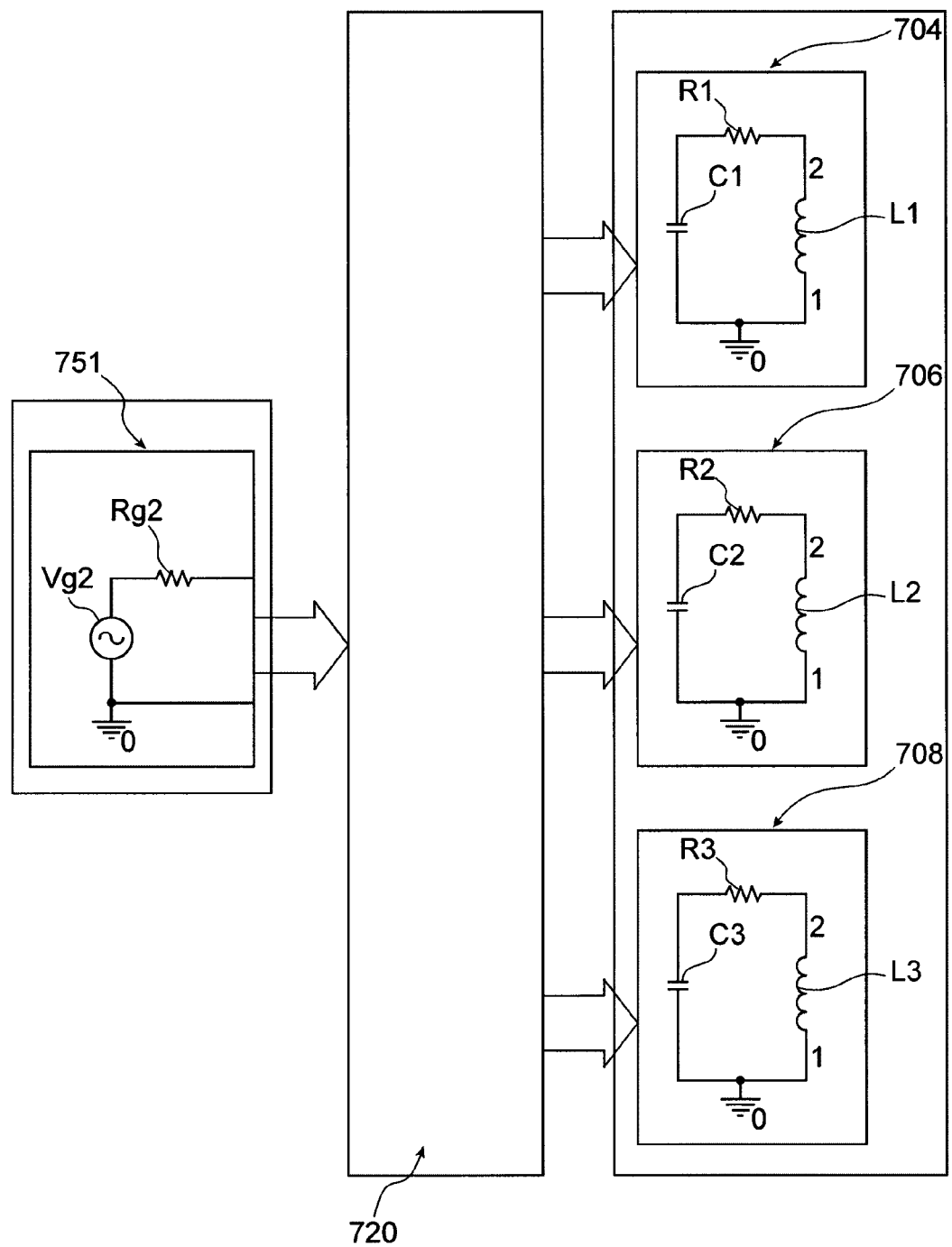
FIG. 23 shows an example of an equivalent electrical circuit for an example signal emission and reception device comprising at least one antenna structure according to the invention with 3 resonant circuits, connected to the same generator through a connection block.

FIG. 23 shows a variant of the example described above. In this variant, a single generator circuit 750 is connected to the three circuits 704, 706 and 708 through the connection block 720.

Figure 24:
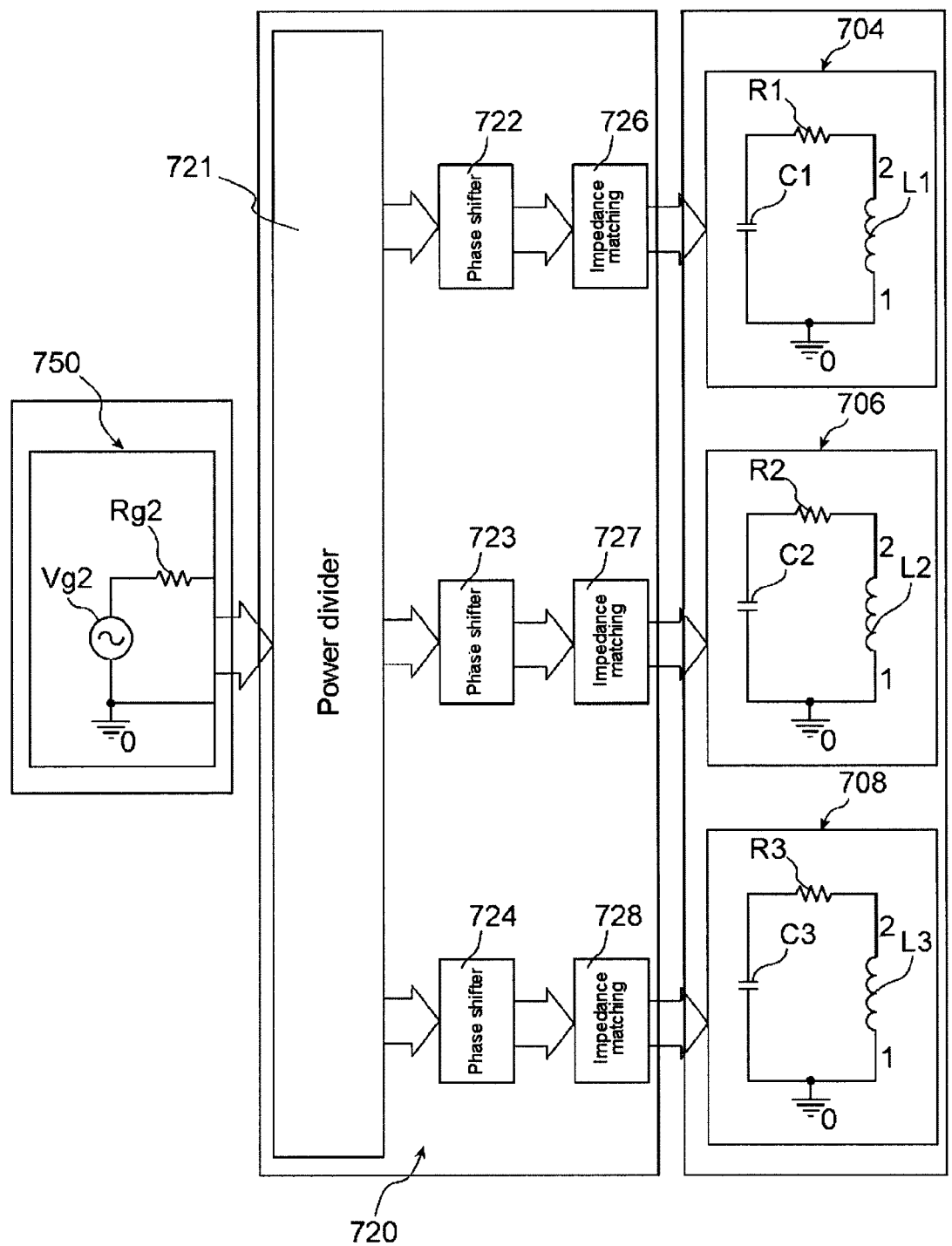
FIG. 24 shows an example embodiment of the connection block of the device in FIG. 23.
Figure 25:
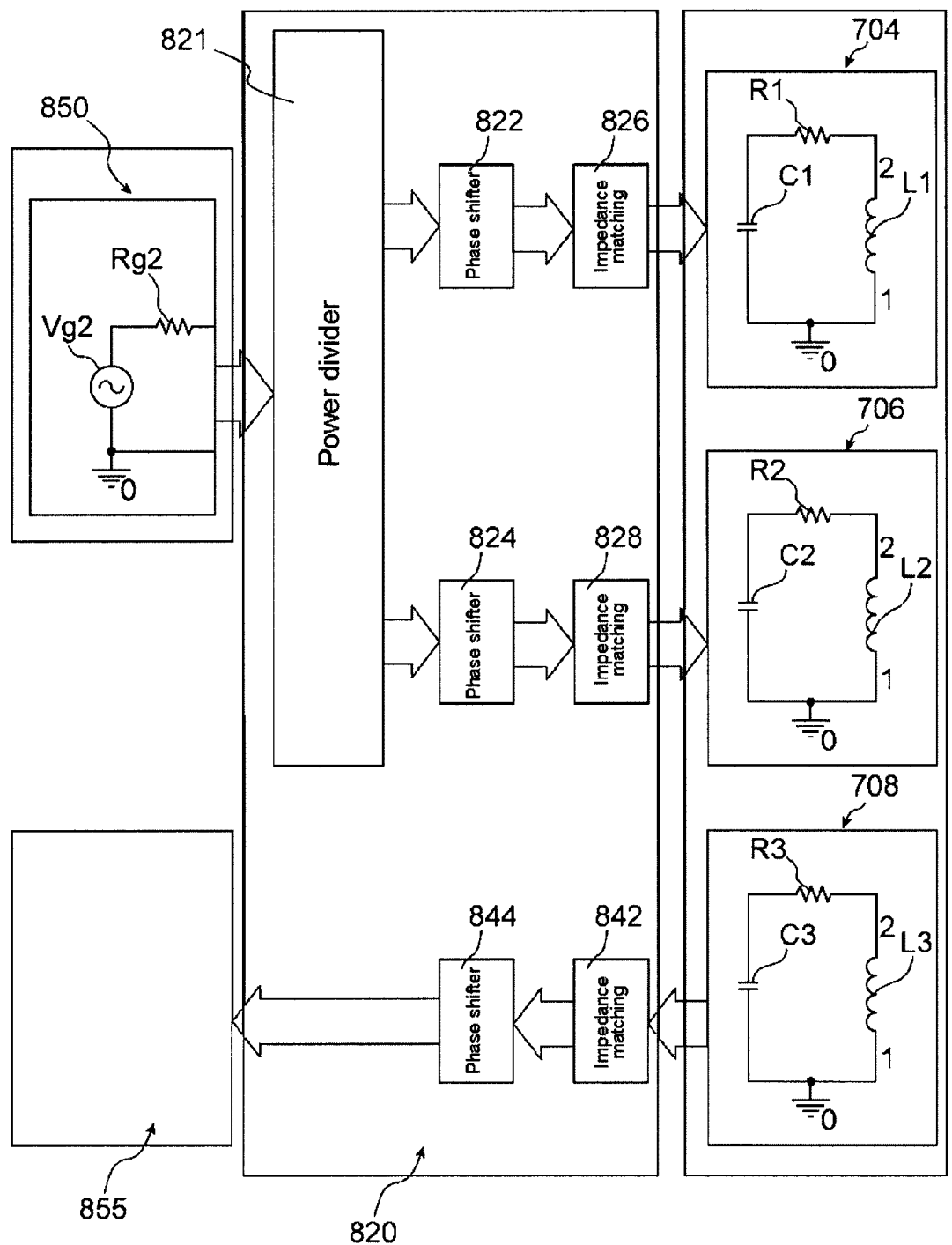
FIG. 25 shows an example of an equivalent electrical circuit for an example signal emission and reception device comprising at least one antenna structure according to the invention with 3 resonant circuits, two resonant circuits being connected to the same generator through a connection block and another resonant circuit being connected to a reception stage through said connection block, Identical, similar or equivalent parts of the different figures have the same numeric references so as to facilitate comparisons between one figure and another.

FIG. 24 contains an example embodiment of the connection block 720.

In this example, the connection block 720 comprises a power divider module 721 at the input that can be made for example using passive components.

The power divider module 721 is connected to phase shift modules, for example to three phase shift modules 722, 723, 724, that may be made for example using delay lines or for example using corresponding chosen characteristic impedances for which the corresponding lengths depend on the required phase shift.

The phase shift modules 722, 723 and 724 may be connected to impedance matching modules 726, 727 and 728 respectively, that may be made for example using transformers such as ferrite core transformers. Impedance matching modules 726, 727 and 728 may be provided at the output from the connection block and may be connected to circuits 704, 706 and 708 respectively.

A variant (FIG. 25) of the example described above includes a first resonant circuit 704 and a second resonant circuit 706 dedicated to emission of signals, and a third resonant circuit 708 dedicated to reception of signals.

The arrangement of the resonant circuits 704, 706 and 708 may for example be like the arrangement described for circuits 304, 306 and 308 with reference to FIGS. 16A-16B.

The resonant circuits 704, 706 and 708 are connected to a generator 850. The circuit 708 is itself connected to a reception stage 855. A connection block 820 may be provided firstly between the power supply circuit 850 and the resonant circuits 704, 706, and secondly between the reception stage 855 and the resonant circuit 708.

The connection block 820 comprises a power divider module 821 at the input to which the generator 850 is connected. Phase shift modules may be provided at the output from the power divider 821, for example two phase shift modules 822 and 824 are provided for circuits 704 and 706 respectively.

The phase shift modules 822, 824 may be connected to impedance matching modules 826, 828 respectively.

The connection block 820 may also comprise an impedance matching module 842, and means forming a filter 844, between the resonant circuit 708 specifically used for reception of signals and the reception stage 855.

A transmission device and in particular an antenna structure like that described above in any of the embodiments described previously, may be integrated into a secure communication system like that disclosed in patent application "secure communication system between a contactless card reader and a card" filed in France by the applicant, French application number 07/02227.

The invention claimed is:

1. A device for transmission of signals by contactless inductive coupling comprising at least one structure forming one or several antennas, said structure comprising a set of at least first and second pluralities of conducting links, each plurality of conducting links forming a conducting circuit through which a current may circulate, the conducting circuits being distinct such that the current circulating in each circuit may be different, the set of said conducting links being arranged such that there is a projection of the conducting links in the form of a first contour with a first shape, a second contour located inside the first contour and in the same plane and with a second shape homothetic with said first shape, and a plurality of segments connecting the first contour and the second contour.

2. The device according to claim 1, in which each conducting circuit is located in a distinct plane.

3. The device according to claim 1, in which said conducting links in a particular circuit are included in at least 2 distinct parallel planes.

4. The device according to claim 1, each conducting circuit comprising a sequence of conducting parts, each conducting part being formed from:
    a first conducting link the projection of which forms a portion of said first contour,
    a second conducting link the projection of which forms a transition segment between the first contour and the second contour,
    a third conducting link the projection of which forms a portion of the second contour
    a fourth conducting link the projection of which forms a transition segment between the second contour and the first contour.

5. The device according to claim 1, said conducting links being arranged such that the coefficient coupling between pairs of said circuits is zero or at least less than 5% or less than 1%.

6. The device according to claim 1, in which each circuit is arranged so as to form a resonant loop.

7. The device according to claim 1, said segments connecting the first contour and the second contour being located on straight lines passing through the homothetic centre of said contours.

8. The device according to claim 1, in which said first shape and said second shape are polygonal, or circular or elliptical.

9. The device according to claim 1, in which at least one of said conducting circuits comprises one or several passive components.

10. The device according to claim 1, said structure comprising three pluralities of conducting links forming three distinct conducting circuits.

11. The device according to claim 1, each circuit being coupled or connected to a generator.

12. The device according to claim 1, in which at least one of said conducting circuits is connected to a generator, and at least one other of said circuits is connected to a signal reception stage.

13. The device according to claim 1, in which one or several of said conducting circuits are connected to one or several generators, the device comprising at least one connection block between said conducting circuits and said generators, the connection block comprising at least one power divider module, and/or at least one phase shift module, and/or at least one impedance matching module.

14. The device according to claim 1, in which one or several of said circuits is (are) connected to one or several signal reception stages, the device comprising at least one connection block between said conducting circuits and said reception stages, the connection block comprising at least filter means and/or at least one impedance matching module.

15. An inductive coupling or contactless communication device between a reader and at least a mobile object comprising a signal transmission device according to claim 1.

* * * * *